United States Patent
Komine et al.

(10) Patent No.: US 11,976,341 B2
(45) Date of Patent: May 7, 2024

(54) STEEL SHEET, MEMBER, AND METHOD FOR PRODUCING THEM

(71) Applicant: JFE STEEL CORPORATION, Tokyo (JP)

(72) Inventors: Shinsuke Komine, Tokyo (JP); Tatsuya Nakagaito, Tokyo (JP); Kentaro Sato, Tokyo (JP); Tomohiro Sakaidani, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/010,871

(22) PCT Filed: Jun. 30, 2021

(86) PCT No.: PCT/JP2021/024844
§ 371 (c)(1),
(2) Date: Dec. 16, 2022

(87) PCT Pub. No.: WO2022/004818
PCT Pub. Date: Jan. 6, 2022

(65) Prior Publication Data
US 2023/0220510 A1    Jul. 13, 2023

(30) Foreign Application Priority Data

Jun. 30, 2020 (JP) .................. 2020-113061
Apr. 30, 2021 (JP) .................. 2021-076976

(51) Int. Cl.
*C21D 9/46* (2006.01)
*C21D 8/02* (2006.01)
(Continued)

(52) U.S. Cl.
CPC ............ *C21D 9/46* (2013.01); *C21D 8/0226* (2013.01); *C21D 8/0236* (2013.01);
(Continued)

(58) Field of Classification Search
None
See application file for complete search history.

(56) References Cited

U.S. PATENT DOCUMENTS

2011/0318217 A1* 12/2011 Fujita .................. C22C 38/02
420/8
2016/0312326 A1   10/2016 Drillet et al.

FOREIGN PATENT DOCUMENTS

EP    3 231 887 A1    10/2017
EP    3 415 653 A1    12/2018
(Continued)

OTHER PUBLICATIONS

Jul. 19, 2023 Office Action issued in Chinese Patent Application No. 202180043462X.
Feb. 27, 2023 Search Report issued in European Patent Application No. 21832492.9.
Sep. 14, 2021 International Search Report issued in International Patent Application No. PCT/JP2021/024844.

*Primary Examiner* — Daniel J. Schleis
(74) *Attorney, Agent, or Firm* — Oliff PLC

(57) ABSTRACT

A steel sheet including a chemical composition satisfying an equivalent carbon content of 0.60% or more and less than 0.85%, and a steel microstructure with an area fraction of ferrite: less than 40%, tempered martensite and bainite: 40% or more in total, retained austenite: 3% to 15%, and ferrite, tempered martensite, bainite, and retained austenite: 93% or more in total. A 90-degree bending at a curvature radius/thickness ratio of 4.2 in a rolling (L) direction with respect to an axis extending in a width (C) direction causes a change of 0.40 or more in (a grain size in a thickness direction)/(a grain size in a direction perpendicular to the thickness) of the tempered martensite in an L cross section in a 0- to 50-μm region from a surface of the steel sheet on a compression side. The steel sheet has a tensile strength of 980 MPa or more.

20 Claims, 4 Drawing Sheets

(51) Int. Cl.
*C22C 38/00* (2006.01)
*C22C 38/02* (2006.01)
*C22C 38/04* (2006.01)
*C22C 38/06* (2006.01)
*C22C 38/60* (2006.01)
*C23C 2/06* (2006.01)
*C23C 2/40* (2006.01)
*C25D 3/22* (2006.01)

(52) U.S. Cl.
CPC .......... *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C22C 38/60* (2013.01); *C23C 2/06* (2013.01); *C23C 2/40* (2013.01); *C25D 3/22* (2013.01); *C21D 2211/001* (2013.01); *C21D 2211/002* (2013.01); *C21D 2211/005* (2013.01); *C21D 2211/008* (2013.01)

(56) References Cited

FOREIGN PATENT DOCUMENTS

| | | |
|---|---|---|
| EP | 3 786 310 A1 | 3/2021 |
| JP | 2012-31462 A | 2/2012 |
| JP | 2012-122093 A | 6/2012 |
| JP | 2015-175061 A | 10/2015 |
| JP | 2015-190008 A | 11/2015 |
| JP | 2016-191125 A | 11/2016 |
| WO | 2015/019557 A1 | 2/2015 |
| WO | 2019/069771 A1 | 4/2019 |
| WO | 2019/159771 A1 | 8/2019 |
| WO | 2019/208556 A1 | 10/2019 |

\* cited by examiner

STEEL SHEET, MEMBER, AND METHOD FOR PRODUCING THEM

TECHNICAL FIELD

This application relates to a high-strength steel sheet or member with good collision characteristics and a method for producing the steel sheet or member. A steel sheet according to the application can be suitably used for parts mainly used in the automotive field.

BACKGROUND

To reduce $CO_2$ emissions from the perspective of global environmental conservation, it is always important in the automobile industry to reduce the weights of automobile bodies while maintaining their strength and improve mileage. To reduce the weights of automobile bodies while maintaining their strength, it is effective to increase strength of steel sheets used as materials for automotive parts and thereby reduce the thickness of the steel sheets. On the other hand, automotive parts made of steel sheets are required to ensure the safety of occupants in the automobile in case of a collision. Thus, high-strength steel sheets used as materials for automotive parts are required to have good collision characteristics as well as desired strength.

In recent years, high-strength steel sheets with a tensile strength (hereinafter also referred to simply as TS) of 980 MPa or more have been increasingly applied to automobile bodies. From the perspective of collision characteristics, automotive parts are broadly divided into non-deformable members, such as pillars and bumpers, and energy-absorbing members, such as side members. These members should have collision characteristics necessary to ensure the safety of occupants in a moving automobile in case of a collision. Strength of non-deformable members have been increased, and high-strength steel sheets with a TS of 980 MPa or more have already been practically used. When applied to energy-absorbing members, however, in case of a collision, high-strength steel sheets with a TS of 980 MPa or more tend to cause a member fracture originating from a portion subjected to primary processing of forming and cannot consistently absorb collision energy. Thus, high-strength steel sheets with a TS of 980 MPa or more have not yet been practically used. Thus, there is room for preventing member fracture in case of a collision, consistently exhibiting high energy absorption to ensure safety in case of a collision, and reducing weight to contribute to environmental conservation. Thus, a high-strength steel sheet with good collision characteristics and with a TS of 980 MPa or more should be applied to an energy-absorbing member.

To address such a need, for example, Patent Literature 1 discloses a technique related to an ultra-high-strength steel sheet with high formability and impact resistance and with a TS of 1200 MPa. Patent Literature 2 discloses a technique related to a high-strength steel sheet with a maximum tensile strength of 780 MPa or more applicable to an impact-absorbing member in case of a collision.

CITATION LIST

Patent Literature

PTL 1: Japanese Unexamined Patent Application Publication No. 2012-31462

PTL 2: Japanese Unexamined Patent Application Publication No. 2015-175061

SUMMARY

Technical Problem

Although collision characteristics are examined in Patent Literature 1, impact resistance is examined on the assumption that a member is not broken in case of a collision, and collision characteristics are not examined from the perspective of member fracture resistance.

In Patent Literature 2, a dynamic axial crushing test with a falling weight is performed on a hat-shaped member to evaluate cracking and fracture resistance at a TS of more than 780 MPa. However, rating cracking after crushing cannot evaluate the process from the initiation of a crack during the crushing to the fracture, which is important for collision characteristics. This is because, if a crack occurs early in the process of crushing, even a small crack that does not pass through the sheet may reduce absorbing energy. Furthermore, if a crack occurs in the later stage in the process of crushing, even a large crack that passes through the sheet may have little effect on absorbing energy. Thus, only rating cracking after crushing is probably insufficient for the evaluation of fracture resistance.

In view of such situations, it is an object of the disclosed embodiments to provide a steel sheet or member with a tensile strength (TS) of 980 MPa or more and with good collision characteristics suitable for an energy-absorbing member of an automobile and a method for producing the steel sheet or member.

Solution to Problem

As a result of extensive studies to solve the above problems, the inventors have found the following.

A steel sheet has a chemical composition satisfying an equivalent carbon content Ceq of 0.60% or more and less than 0.85% and a steel microstructure with an area fraction of ferrite: less than 40%, tempered martensite and bainite: 40% or more in total, retained austenite: 3% to 15%, and ferrite, tempered martensite, bainite, and retained austenite: 93% or more in total, wherein specified 90-degree bending of the steel sheet causes a change of 0.40 or more in (a grain size in a thickness direction)/(a grain size in a direction perpendicular to the thickness) of the tempered martensite in an L cross section in a 0- to 50-μm region from a surface of the steel sheet on a compression side. It has been found that this can provide a high-strength steel sheet with good collision characteristics.

The disclosed embodiments have been accomplished on the basis of these findings, and the summary of the embodiments is described below.

[1] A steel sheet having
   a chemical composition satisfying an equivalent carbon content Ceq of 0.60% or more and less than 0.85%, and
   a steel microstructure with an area fraction of ferrite: less than 40%, tempered martensite and bainite: 40% or more in total, retained austenite: 3% to 15%, and ferrite, tempered martensite, bainite, and retained austenite: 93% or more in total,
   wherein 90-degree bending at a curvature radius/thickness ratio of 4.2 in a rolling (L) direction with respect to an axis extending in a width (C) direction causes a change of 0.40 or more in (a grain size in a thickness direction)/(a grain size in a direction perpendicular to the thickness) of the tempered martensite in an L cross section in a 0- to 50-μm region from a surface of the steel sheet on a compression side, and the steel sheet has a tensile strength of 980 MPa or more.

[2] The steel sheet according to [1], wherein the chemical composition contains, on a mass percent basis,
C: 0.07% to 0.20%,
Si: 0.1% to 2.0%,
Mn: 2.0% to 3.5%,
P: 0.05% or less,
S: 0.05% or less,
Sol. Al: 0.005% to 0.1%, and
N: 0.010% or less, a remainder being composed of Fe and incidental impurities.

[3] The steel sheet according to [2], wherein the chemical composition further contains, on a mass percent basis, at least one selected from
Cr: 1.0% or less,
Mo: 0.5% or less,
V: 0.5% or less,
Ti: 0.5% or less,
Nb: 0.5% or less,
B: 0.005 or less,
Ni: 1.0% or less,
Cu: 1.0% or less,
Sb: 1.0% or less,
Sn: 1.0% or less,
Ca: 0.005% or less, and
REM: 0.005% or less.

[4] The steel sheet according to any one of [1] to [3], having an electrogalvanized layer, a hot-dip galvanized layer, or a hot-dip galvannealed layer on a surface thereof.

[5] A member produced by performing at least one of forming and welding on the steel sheet according to any one of [1] to [4].

[6] A method for producing a steel sheet, including:
a hot-rolling step of hot-rolling a steel slab satisfying an equivalent carbon content Ceq of 0.60% or more and less than 0.85% and having the chemical composition according to [2] or [3] at a finish rolling temperature in the range of 850° C. to 950° C. and coiling the resulting hot-rolled steel sheet at a coiling temperature of 600° C. or less;
a cold-rolling step of cold-rolling the hot-rolled steel sheet after the hot-rolling step at a rolling reduction of more than 20%;
an annealing step of heating the cold-rolled steel sheet after the cold-rolling step to an annealing temperature of 750° C. or more and holding the steel sheet for 30 seconds or more;
a quenching step of cooling the steel sheet at an average cooling rate of 20° C./s or more in a temperature range of the annealing temperature to a martensite transformation start temperature Ms and then cooling the steel sheet from the martensite transformation start temperature Ms to a finish cooling temperature in the range of (Ms−250° C.) to (Ms−50° C.) at an average cooling rate in the range of 2° C./s to 15° C./s;
a tempering step of holding the steel sheet in the temperature range of 300° C. to 500° C. for 20 seconds or more; and a heat-treatment step of holding the steel sheet in the temperature range of 100° C. to 300° C. for 20 seconds or more after the tempering step.

[7] The method for producing a steel sheet according to [6], including a coating step of applying electrogalvanizing, hot-dip galvanizing, or hot-dip galvannealing to a surface of the steel sheet after the tempering step and before the heat-treatment step.

[8] A method for producing a member, including the step of performing at least one of forming and welding on a steel sheet produced by the method for producing a steel sheet according to [6] or [7].

Advantageous Effects

The disclosed embodiments can provide a steel sheet with a tensile strength (TS) of 980 MPa or more and with good collision characteristics. A member produced by performing forming, welding, or the like on a steel sheet according to the disclosed embodiments can be suitably used as an energy-absorbing member used in the automotive field.

DETAILED DESCRIPTION

Figure 1:
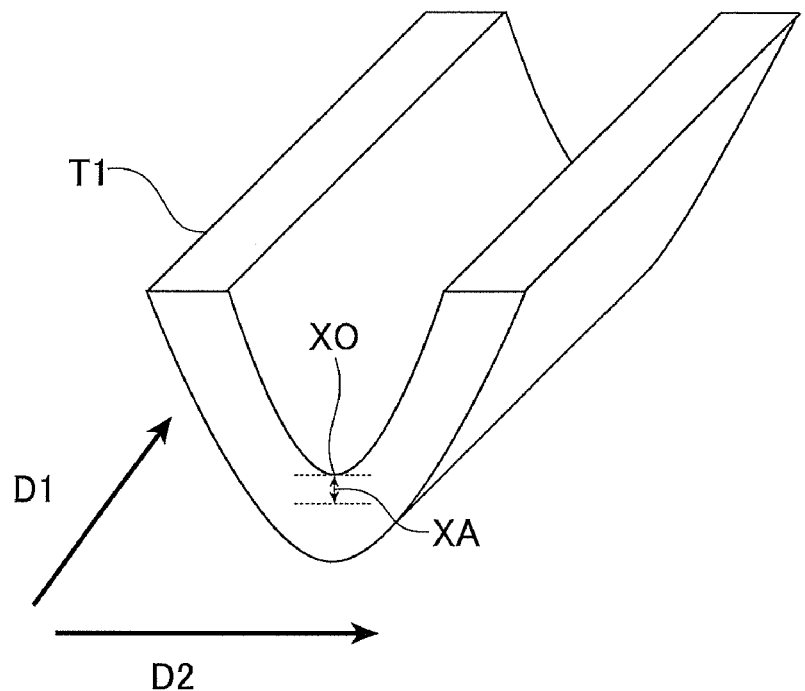
FIG. 1 is an explanatory view of a steel sheet after 90-degree bending (primary bending).

Embodiments are described in detail below.

A steel sheet according to the disclosed embodiments has a chemical composition satisfying an equivalent carbon content Ceq of 0.60% or more and less than 0.85% and a steel microstructure with an area fraction of ferrite: less than 40%, tempered martensite and bainite: 40% or more in total, retained austenite: 3% to 15%, and ferrite, tempered martensite, bainite, and retained austenite: 93% or more in total.

Equivalent Carbon Content Ceq: 0.60% or More and Less than 0.85%

The equivalent carbon content Ceq refers to the effects of elements other than C converted into the C content as a measure of the strength of steel. Setting the equivalent carbon content Ceq to 0.60% or more and less than 0.85% allows the area fraction of each metallic microstructure, such as ferrite, described later to be controlled within the scope of the disclosure. Setting the equivalent carbon content Ceq to 0.60% or more, preferably 0.65% or more, can provide the strength of the disclosed embodiments. On the other hand, setting the equivalent carbon content Ceq to less than 0.85%, preferably 0.80% or less, can produce the effect of improving collision characteristics in the disclosed embodiments.

The equivalent carbon content Ceq can be determined using the following formula.

Equivalent carbon content $Ceq=[C\%]+([Si\%]/24)+([Mn\%]/6)+([Ni\%]/40)+([Cr\%]/5)+([Mo\%]/4)+([V\%]/14)$ The [element symbol %] in the formula represents the element content (% by mass) and is 0 for an element not contained.

Area Fraction of Ferrite: Less than 40%

At an area fraction of ferrite of 40% or more, it is difficult to achieve both a TS of 980 MPa or more and collision characteristics. Thus, the area fraction of ferrite is less than 40%, preferably less than 30%. Although the lower limit is not particularly limited, to prevent member fracture in collision deformation and thereby improve collision characteristics, the area fraction of ferrite is preferably 10% or more. The reason for this preferred range is not clear but may be as follows: an area fraction of ferrite of less than 10% probably results in an increased ratio of interface between different phases of tempered martensite and facilitates separation at an interface of the tempered martensite in primary processing. This may concentrate stress in a separated portion, retard the deformation of the tempered martensite and cause a crack, and thereby reduce the effect of preventing member fracture in collision deformation. Thus, the area fraction of ferrite is preferably 10% or more.

Area Fraction of Tempered Martensite and Bainite: 40% or More in Total

Tempered martensite and bainite are effective in preventing member fracture in collision deformation and thereby improving collision characteristics, and in improving absorbed energy and strength in case of a collision. Such effects are insufficient when the total area fraction of tempered martensite and bainite is less than 40%. Thus, the total area fraction is 40% or more, preferably 50% or more.

Although each of tempered martensite and bainite may have any area fraction in the above range, the area fraction of bainite preferably ranges from 3% to 20%. The reason for this preferred range may be as follows: bainite is effective in concentrating C in untransformed austenite during the holding in the tempering step and forming retained austenite and in improving absorbed energy in case of a collision. Such effects may be small at an area fraction of bainite of less than 3%. On the other hand, an area fraction of bainite of more than 20% results in excessive concentration of C in untransformed austenite during the holding in the tempering step and a decrease in martensite transformation start temperature Ms (hereinafter also referred to simply as an Ms temperature or Ms). Thus, martensite formed during the cooling after the holding has a high solute C content, and martensite transformation occurs at a lower temperature. Thus, tempering of martensite during the cooling is insufficient compared with the case where the Ms temperature is higher. This reduces the effect of reducing the hardness difference by the tempered martensite, prevents the tempered martensite from deforming with the ferrite in the primary processing, easily forms a void, and sometimes impairs collision characteristics. Thus, the area fraction of bainite is preferably 3% or more. The area fraction of bainite is preferably 20% or less.

The area fraction of bainite is more preferably 5% or more, still more preferably 8% or more. The area fraction of bainite is more preferably 18% or less, still more preferably 15% or less.

Area Fraction of Retained Austenite: 3% to 15%

Retained austenite is effective in retarding cracking in case of a collision and improving collision characteristics. The mechanism is not clear but may be as follows: retained austenite is work-hardened in collision deformation, increases the curvature radius in bending deformation, and disperses strain in a bent portion. The dispersion of strain reduces stress concentration in a void forming portion in the primary processing and consequently improves collision characteristics. Such effects cannot be produced at an area fraction of retained austenite of less than 3%. Thus, the area fraction of retained austenite is 3% or more, preferably 5% or more. On the other hand, an area fraction of retained austenite of more than 15% may result in lower fracture resistance in case of a collision due to fresh martensite formed by deformation-induced transformation. Thus, the area fraction of retained austenite is 15% or less, preferably 10% or less.

Area Fraction of Ferrite, Tempered Martensite, Bainite, and Retained Austenite: 93% or More in Total A total area fraction of ferrite, tempered martensite, bainite, and retained austenite of less than 93% results in an increased area fraction of a phase other than these phases and makes it difficult to satisfy both the strength and collision characteristics. The other phase is, for example, fresh martensite, pearlite, or cementite, and a total of more than 7% of these phases may act as a starting point of void formation in collision deformation and impair collision characteristics. An increase in the area fraction of pearlite or cementite may result in a decrease in strength. A total area fraction of ferrite, tempered martensite, bainite, and retained austenite of 93% or more results in high strength and good collision characteristics regardless of the type or area fraction of the residual phase(s). Thus, the total area fraction is 93% or more, preferably 95% or more, more preferably 97% or more. The total area fraction may be 100%. The remaining microstructures may be pearlite and cementite, and the total area fraction of the remaining microstructures is 7% or less. The total area fraction of the remaining microstructures is preferably 5% or less, more preferably 3% or less.

The area fraction of ferrite, tempered martensite, and bainite refers to the ratio of the area of each phase to the observed area. The area fraction of each microstructure is measured in the following way. A thickness cross section of a steel sheet cut at a right angle to the rolling direction is polished and etched in 3% by volume nital and is photographed at a quarter thickness position with a scanning electron microscope (SEM) at a magnification of 1500 times in three visual fields. The area fraction of each microstructure is determined from the captured image data using Image-Pro available from Media Cybernetics. The area fraction of each microstructure is the average area fraction of the three visual fields. In the image data, ferrite can be distinguished as black, bainite as black including island-like retained austenite or gray including carbides with the same orientation, tempered martensite as light gray including fine carbides with different orientations, and retained austenite as white.

In the disclosed embodiments, the X-ray diffraction intensity described below is measured to determine the volume fraction of retained austenite, and the volume fraction is regarded as the area fraction of retained austenite. The volume fraction of retained austenite is the ratio of the integrated X-ray diffraction intensity of (200), (220), and (311) planes in fcc iron to the integrated X-ray diffraction intensity of (200), (211), and (220) planes in bcc iron at a quarter thickness.

90-degree bending at a curvature radius/thickness ratio of 4.2 in a rolling (L) direction with respect to an axis extending in a width (C) direction causes a change of 0.40 or more in (a grain size in a thickness direction)/(a grain size in a direction perpendicular to the thickness) of tempered martensite in an L cross section in a 0- to 50-μm region from a surface of a steel sheet on a compression side In a steel sheet according to the disclosed embodiments, good collision characteristics can be achieved by setting the amount of change in (a grain size in a thickness direction)/(a grain size in a direction perpendicular to the thickness) of tempered martensite due to bending to 0.40 or more. The mechanism is not clear but may be as follows: a member fracture in case of a collision responsible for deterioration of collision characteristics starts from the formation and propagation of a crack. It is thought that a crack tends to occur due to lower work hardening ability and the formation or linking of voids in a region with a large hardness difference. Furthermore, in a collision of an actual member, a portion subjected to the primary processing deforms so as to be bent back in a direction perpendicular to the primary processing. A void formed in a region with a large hardness difference subjected to the primary processing concentrates stress around the void, promotes the formation and propagation of a crack, and finally causes a fracture. Thus, martensite is tempered to decrease a region with a large hardness difference, and the formation of a void in a primary processed portion is reduced by plastic deformation with a soft ferrite phase during bending deformation. Furthermore, if necessary, retained austenite is used to reduce stress concentration in the primary processed portion during deformation and reduce the propagation of a crack from a void. This can prevent member fracture and achieve good collision characteristics. To produce these effects, the amount of change in (a grain size in a thickness direction)/(a grain size in a direction perpendicular to the thickness) of tempered martensite due to bending is 0.40 or more.

The amount of change can be achieved, for example, by controlling the cooling rate after annealing and by heat treatment after the tempering step in a production method described later. In the temperature range of the annealing temperature to the martensite transformation start temperature (hereinafter also referred to simply as an Ms temperature or Ms), the cooling rate is increased to decrease ferrite transformation while cooling and reduce the decrease in the Ms temperature. In the temperature range of the Ms temperature to the finish cooling temperature, martensite formed by decreasing the cooling rate is tempered even while cooling. It is thought that softened tempered martensite thus formed deforms plastically with ferrite while bending and reduces the formation of a void. It is also thought that martensite formed after the tempering step becomes tempered martensite, which reduces void formation due to plastic deformation, while maintaining some strength in a predetermined temperature range (100° C. to 300° C.), and stably has high absorbing energy.

The amount of change in (a grain size in a thickness direction)/(a grain size in a direction perpendicular to the thickness) of tempered martensite due to bending is determined by the following measurement method.

First, before a steel sheet is subjected to 90-degree bending, the grain size of tempered martensite in the thickness direction (hereinafter also referred to as a "grain size a1") and the grain size of the tempered martensite in a direction perpendicular to the thickness (hereinafter also referred to as a "grain size a2") are measured in an L cross section in a 0- to 50-μm region from a surface of the steel sheet.

Next, after the steel sheet is subjected to 90-degree bending at a curvature radius/thickness ratio of 4.2 in the rolling (L) direction with respect to an axis extending in the width (C) direction, the grain size of the tempered martensite in the thickness direction (hereinafter also referred to as a "grain size b1") and the grain size of the tempered martensite in a direction perpendicular to the thickness (hereinafter also referred to as a "grain size b2") are measured in an L cross section in a 0- to 50-μm region from a surface of the steel sheet on the compression side.

The measurement position of the grain size after bending in the rolling direction is in a region including a corner formed by the bending and extending in the width (C) direction (see the reference letter D1 in FIG. 1). More specifically, in a region that becomes the lowest portion in the width direction and in a direction perpendicular to the rolling direction (a pressing direction of a pressing portion, such as a punch) by bending, the grain size of the tempered martensite is measured in a 0- to 50-μm region in the thickness direction.

In the disclosed embodiments, the amount of change in (a grain size in a thickness direction)/(a grain size in a direction perpendicular to the thickness) of tempered martensite due to bending is calculated by "(grain size b1/grain size b2)−(grain size a1/grain size a2)".

The grain size of tempered martensite in the thickness direction and the grain size of the tempered martensite in the direction perpendicular to the thickness are measured in the following way. After polishing a thickness cross section of a steel sheet cut in the rolling direction, an L cross section in a 0- to 50-μm region from a surface of the steel sheet at a bending top on the compression side is photographed with a scanning electron microscope (SEM) at a magnification of 3000 times in three visual fields. The grain size of tempered martensite in the thickness direction (the length in the thickness direction) and the grain size of the tempered martensite in a direction perpendicular to the thickness (the length in the direction perpendicular to the thickness) are determined from the captured image data using Image-Pro available from Media Cybernetics. Each grain size is calculated by averaging the grain sizes in the three visual fields. This measurement is performed before and after 90-degree bending.

In the disclosed embodiments, performing 90-degree bending in the rolling (L) direction with respect to an axis extending in the width (C) direction refers to bending a steel sheet by pressing a surface of the steel sheet in a direction perpendicular to the width direction and the rolling direction (see the reference letters D1 and D2 in FIG. 1) such that the distance between both end portions is shortened when the steel sheet is viewed in the width (C) direction (see the reference letter D1 in FIG. 1) (when a steel sheet is viewed in the width direction (in a vertical cross-sectional view in the width direction)), and pressing the steel sheet such that the angle between flat portions of the end portions not subjected to bending is 90 degrees.

A surface of a steel sheet on the compression side refers to a surface of the steel sheet to be pressed as described above (a surface of the steel sheet in contact with a pressing portion, such as a punch).

An L cross section before bending refers to a cross section parallel to the rolling direction and perpendicular to a surface of a steel sheet (a cross section perpendicular to the width direction).

An L cross section after bending refers to a cross section that is formed by cutting parallel to the direction of deformation caused by bending and that is perpendicular to the width direction.

90-degree bending can be bending by a V-block method, bending by drawing, or the like.

A steel sheet according to the disclosed embodiments may have an electrogalvanized layer, a hot-dip galvanized layer, or a hot-dip galvannealed layer on a surface thereof.

A steel sheet according to the disclosed embodiments has a tensile strength (TS) of 980 MPa or more. The term "high strength", as used herein, refers to a tensile strength (TS) of 980 MPa or more. The upper limit of tensile strength (TS) is preferably, but not limited to, 1600 MPa or less, more preferably 1500 MPa or less, in terms of the balance with other characteristics. The tensile strength (TS) is determined by taking a JIS No. 5 test piece for tensile test (JIS Z 2201) from a steel sheet in a direction perpendicular to the rolling direction and performing a tensile test at a strain rate of $10^{-3}$/s in accordance with JIS Z 2241 (2011).

A steel sheet according to the disclosed embodiments preferably has a thickness in the range of 0.2 to 3.2 mm in order to effectively achieve the advantages of embodiments.

A steel sheet according to the disclosed embodiments has good collision characteristics. The term "good collision characteristics", as used herein, refers to high fracture resistance and absorbing energy. The term "good fracture resistance", as used herein, refers to an average stroke ΔS of 27 mm or more at the maximum load in a bending-orthogonal bending test described later. The term "good collision characteristics", as used herein, refers to an average area $F_{ave}$ of 40000 N or more at a stroke in the range of 0 to 100 mm in a crushing stroke-load graph in an axial crushing test described later.

The bending-orthogonal bending test is performed as described below.

Figure 2:
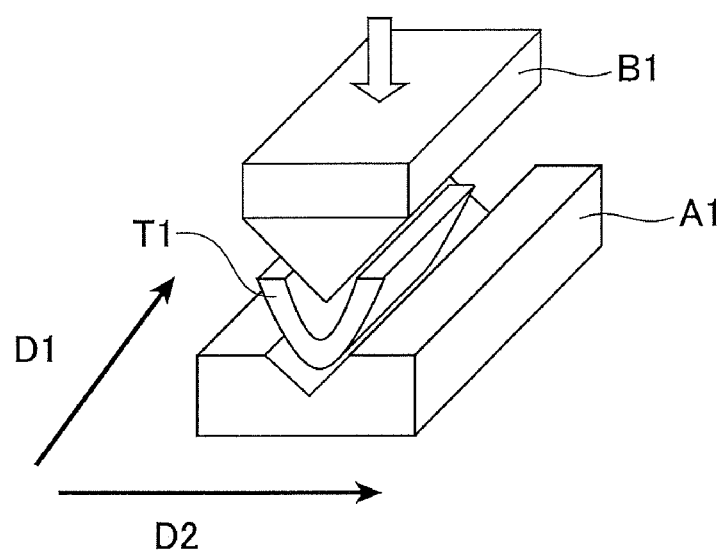
FIG. 2 is an explanatory view of the 90-degree bending (primary bending) in a bending-orthogonal bending test in Examples.
Figure 3:
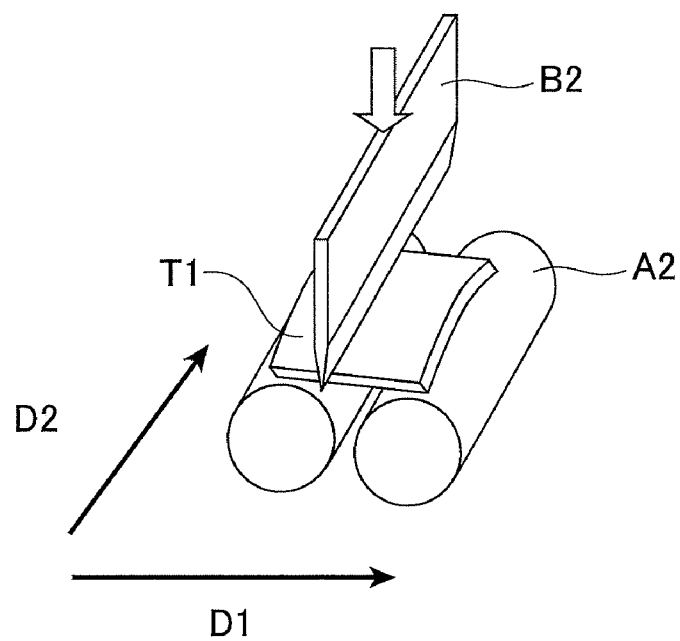
FIG. 3 is an explanatory view of orthogonal bending (secondary bending) in a bending-orthogonal bending test in Examples.

First, a steel sheet is subjected to 90-degree bending (primary bending) at a curvature radius/thickness ratio of 4.2 in the rolling (L) direction with respect to an axis extending in the width (C) direction to prepare a test specimen. In the 90-degree bending (primary bending), as illustrated in FIG. 2, a punch B1 is pressed against a steel sheet on a die A1 with a V-groove to prepare a test specimen T1. Next, as illustrated in FIG. 3, the test specimen T1 on support rolls A2 is subjected to orthogonal bending (secondary bending) by pressing a punch B2 against the test specimen T1 in the direction perpendicular to the rolling direction. In FIGS. 2 and 3, D1 denotes the width (C) direction, and D2 denotes the rolling (L) direction.

Figure 4:
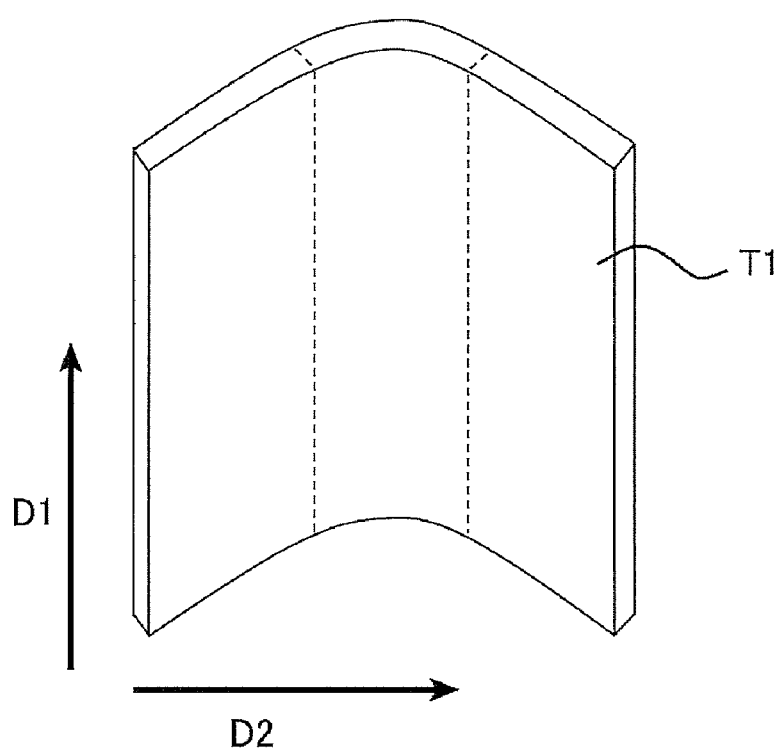
FIG. 4 is a perspective view of a test specimen subjected to the 90-degree bending (primary bending).
Figure 5:
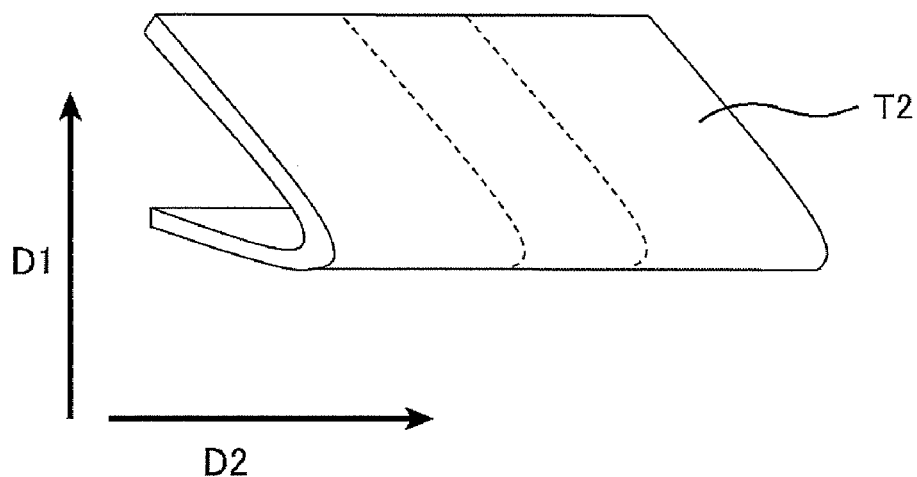
FIG. 5 is a perspective view of a test specimen subjected to the orthogonal bending (secondary bending).

FIG. 4 illustrates the test specimen T1 after the steel sheet is subjected to the 90-degree bending (primary bending). FIG. 5 illustrates the test specimen T2 after the test specimen T1 is subjected to the orthogonal bending (secondary bending). The positions indicated by the broken lines on the test specimen T2 in FIG. 5 correspond to the positions indicated by the broken lines on the test specimen T1 in FIG. 4 before the orthogonal bending.

The conditions for the orthogonal bending are as follows:
[Orthogonal Bending Conditions]
 Test method: roll support, punch pressing
 Roll diameter: ϕ30 mm
 Punch tip R: 0.4 mm
 Distance between rolls: (sheet thickness×2)+0.5 mm
 Stroke speed: 20 mm/min
 Test specimen size: 60 mm×60 mm
 Bending direction: a direction perpendicular to the rolling direction The stroke at the maximum load is determined in a stroke-load curve of the orthogonal bending. The average stroke ΔS at the maximum load is determined by performing the bending-orthogonal bending test three times.

The axial crushing tests are all performed as described below.

Figure 6:
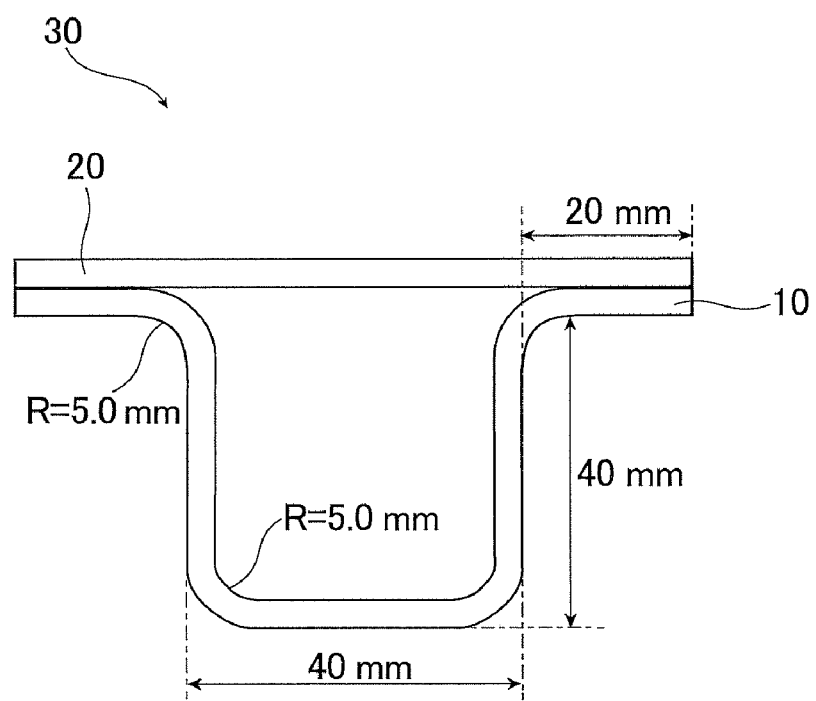
FIG. 6 is a front view of a test member composed of a hat-shaped member and a steel sheet spot welded together for an axial crushing test in Examples.
Figure 7:
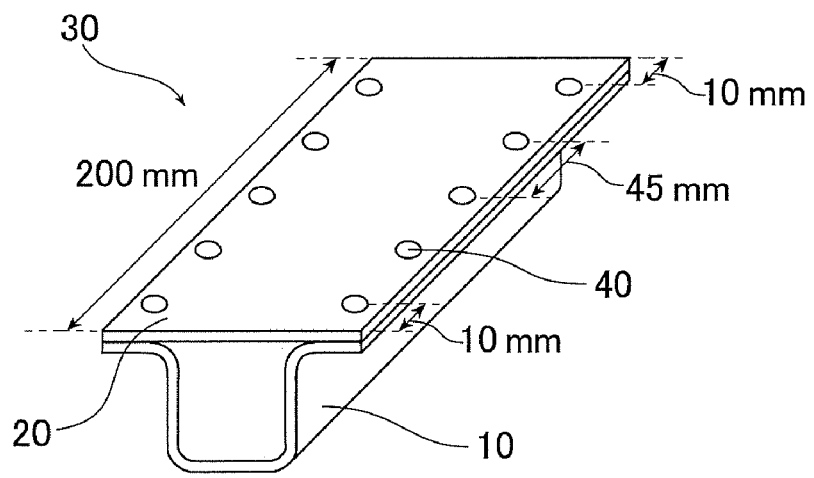
FIG. 7 is a perspective view of the test member illustrated in FIG. 6.
Figure 8:
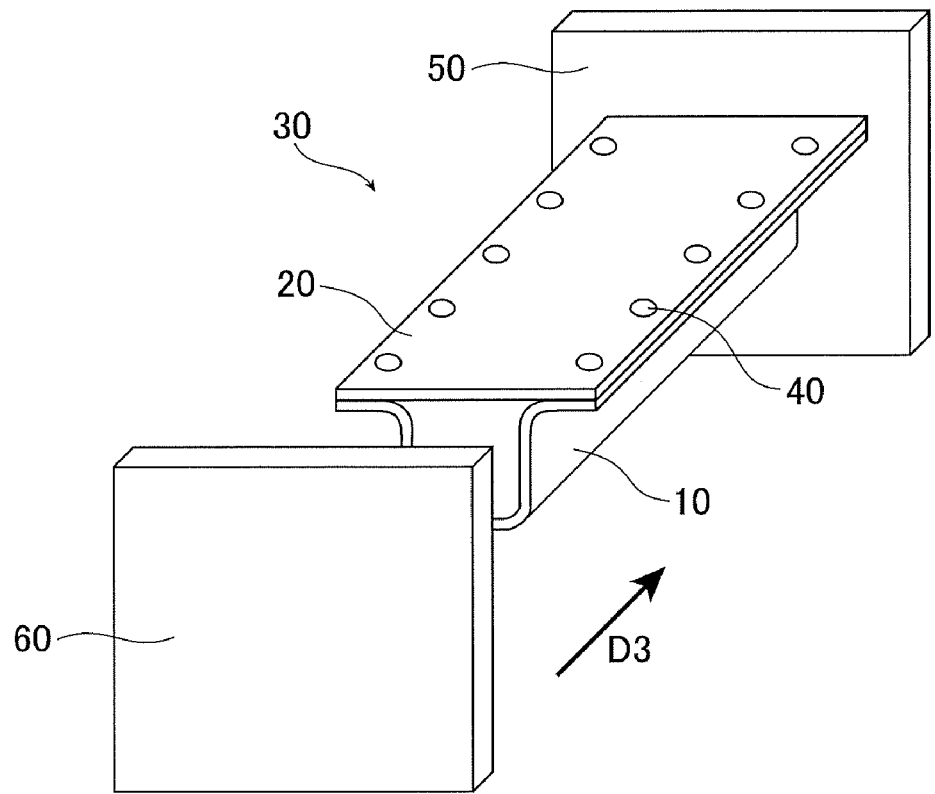
FIG. 8 is a schematic explanatory view of an axial crushing test in Examples.

First, the axial crushing test is performed on steel sheets 1.2 mm in thickness in consideration of the effects of the thickness. A steel sheet produced through the production steps described above is cut and formed (bent) to a depth of 40 mm using a die with a punch shoulder radius of 5.0 mm and a die shoulder radius of 5.0 mm to produce a hat-shaped member 10 illustrated in FIGS. 6 and 7. The steel sheet used as the material of the hat-shaped member is separately cut into a size of 200 mm×80 mm. Next, a steel sheet 20 thus cut out and the hat-shaped member 10 are spot welded to produce a test member 30 as illustrated in FIGS. 6 and 7. FIG. 6 is a front view of the test member 30 produced by spot-welding the hat-shaped member 10 and the steel sheet 20. FIG. 7 is a perspective view of the test member 30. As illustrated in FIG. 7, spot welds 40 are positioned such that the distance between an end portion of the steel sheet and a weld is 10 mm and the distance between the welds is 45 mm. Next, as illustrated in FIG. 8, the test member 30 is joined to a base plate 50 by TIG welding to prepare a sample for the axial crushing test. Next, the prepared axial crushing test sample is collided with an impactor 60 at a constant impact speed of 10 m/s to crush the axial crushing test sample by 100 mm. As illustrated in FIG. 8, the crushing direction D3 is parallel to the longitudinal direction of the test member 30. The area in a crushing stroke-load graph at a stroke in the range of 0 to 100 mm is determined, and the average area of the test performed three times is taken as absorbed energy ($F_{ave}$).

Next, preferred ranges in the chemical composition of a steel sheet are described. Unless otherwise specified, "%" representing the component element content refers to "% by mass".

C: 0.07% to 0.20%

C facilitates the formation of a phase other than ferrite and forms an alloy compound with Nb, Ti, or the like. C is therefore an element necessary for strength improvement. Desired strength may not be achieved at a C content of less than 0.07% even if the production conditions are optimized. Thus, the C content is preferably 0.07% or more, more preferably 0.10% or more. At a C content of more than 0.20%, however, the strength of martensite increases excessively, and the collision characteristics of the disclosed embodiments may not be achieved even if the production conditions are optimized. Thus, the C content is preferably 0.20% or less, more preferably 0.18% or less.

Si: 0.1% to 2.0%

Si is a ferrite-forming element and is also a solid-solution strengthening element. Thus, Si contributes to an improvement in the balance between strength and ductility. To produce this effect, the Si content is preferably 0.1% or more, more preferably 0.2% or more. On the other hand, a Si content of more than 2.0% may result in lower deposition or adhesion in galvanization and poor surface quality. Thus, the Si content is preferably 2.0% or less, more preferably 1.5% or less.

Mn: 2.0% to 3.5%

Mn is a martensite-forming element and is also a solid-solution strengthening element. Mn contributes to the stabilization of retained austenite. To produce these effects, the Mn content is preferably 2.0% or more. The Mn content is more preferably 2.5% or more. On the other hand, a Mn content of more than 3.5% may result in an increased volume fraction of retained austenite and poor collision characteristics. Thus, the Mn content is preferably 3.5% or less, more preferably 3.3% or less.

P: 0.05% or Less

P is an element effective in strengthening steel. However, a P content of more than 0.05% may result in a much lower alloying rate. An excessively high P content of more than 0.05% may result in embrittlement due to grain boundary segregation and result in lower fracture resistance in case of a collision even with a steel microstructure of the disclosed embodiments. Thus, the P content is preferably 0.05% or less, more preferably 0.01% or less. Although the P content may have any lower limit, the lower limit industrially applicable at present is 0.002%, the P content is preferably 0.002% or more.

S: 0.05% or Less

S forms an inclusion MnS or the like, causes a crack in a weld along the metal flow, and may impair collision characteristics even with a steel microstructure of the disclosed embodiments. Thus, the S content is preferably as low as possible but is preferably 0.05% or less in terms of production costs. The S content is more preferably 0.01% or less. Although the S content may have any lower limit, the lower limit industrially applicable at present is 0.0002%, the S content is preferably 0.0002% or more.

Sol. Al: 0.005% to 0.1%

Al acts as a deoxidizing agent and is also a solid-solution strengthening element. A Sol. Al content of less than 0.005% may be insufficient for these effects and may result in lower strength even with a steel microstructure of the disclosed embodiments. Thus, the Sol. Al content is preferably 0.005% or more. On the other hand, a Sol. Al content of more than 0.1% results in lower slab quality in steelmaking. Thus, the Sol. Al content is preferably 0.1% or less, more preferably 0.041 or less.

N: 0.010% or Less

N forms a coarse inclusion of a nitride or carbonitride, such as TiN, (Nb, Ti) (C, N), or AlN, in steel and impairs collision characteristics. Thus, the N content should be reduced. A N content of more than 0.010% tends to result in poor collision characteristics. Thus, the N content is preferably 0.010% or less. The N content is more preferably 0.007% or less, still more preferably 0.005% or less. Although the N content may have any lower limit, the lower limit industrially applicable at present is 0.0003%, the N content is preferably 0.0003% or more.

A chemical composition of a steel sheet according to the disclosed embodiments contains these component elements as base components and the remainder composed of iron (Fe) and incidental impurities. A steel sheet according to the disclosed embodiments preferably has a chemical composition that contains the base components and the remainder composed of iron (Fe) and incidental impurities.

A steel sheet according to the disclosed embodiments may contain the following components (optional elements) depending on desired characteristics.

At least one selected from Cr: 1.0% or less, Mo: 0.5% or less, V: 0.5% or less, Ti: 0.5% or less, Nb: 0.5% or less, B: 0.005% or less, Ni: 1.0% or less, Cu: 1.0% or less, Sb: 1.0% or less, Sn: 1.0% or less, Ca: 0.005% or less, and REM: 0.005% or less Cr, Mo, and V are elements that are effective in improving hardenability and strengthening steel. However, the excessive addition of more than 1.0% of Cr, more than 0.5% of Mo, or more than 0.5% of V has saturated effects and further increases the raw material cost. This may also excessively increase the second phase fraction and reduce fracture resistance in case of a collision. Thus, when any one of Cr, Mo, and V is contained, the Cr content is preferably 1.0% or less, the Mo content is preferably 0.5% or less, and the V content is preferably 0.5% or less. More preferably, the Cr content is 0.8% or less, the Mo content is 0.4% or less, and the V content is 0.4% or less. The advantages of the disclosed embodiments can be achieved even at a low Cr, Mo, or V content. Thus, the Cr, Mo, or V content may have any lower limit. To more effectively produce the effects of hardenability, the Cr, Mo, or V content is preferably 0.005% or more. More preferably, the Cr, Mo, or V content is 0.01% or more.

Ti and Nb are elements effective for precipitation strengthening of steel. However, a Ti content or a Nb content of more than 0.5% may result in lower fracture resistance in case of a collision. Thus, when either Ti or Nb is contained, the Ti content or the Nb content is preferably 0.5% or less. More preferably, the Ti content or the Nb content is 0.4% or less. The advantages of the disclosed embodiments can be achieved even at a low Ti or Nb content. Thus, the Ti or Nb content may have any lower limit. To more effectively produce the effects of precipitation strengthening of steel, the Ti content or the Nb content is preferably 0.005% or more. More preferably, the Ti content or the Nb content is 0.01% or more.

B may be added as required because B prevents the formation and growth of ferrite from an austenite grain boundary and contributes to an improvement in hardenability. However, a B content of more than 0.005% may result in lower fracture resistance in case of a collision. Thus, when B is contained, the B content is preferably 0.005% or less. More preferably, the B content is 0.004% or less. The advantages of the disclosed embodiments can be achieved even at a low B content. Thus, the B content may have any lower limit. To more effectively produce the effects of improving hardenability, the B content is preferably 0.0003% or more. More preferably, the B content is 0.0005% or more.

Ni and Cu are elements effective in strengthening steel. However, a Ni or Cu content of more than 1.0% may result in lower fracture resistance in case of a collision. Thus, when Ni or Cu is contained, the Ni or Cu content is preferably 1.0% or less. More preferably, the Ni content or the Cu content is 0.9% or less. The advantages of the disclosed embodiments can be achieved even at a low Ni or Cu content. Thus, the Ni or Cu content may have any lower limit. To more effectively produce the effects of strengthening steel, the Ni content or the Cu content is preferably 0.005% or more. More preferably, the Ni content or the Cu content is 0.01% or more.

Sn and Sb may be added as required to reduce nitriding and oxidation of a surface of a steel sheet and decarburization in a region near a surface of a steel sheet. Such prevention of nitriding or oxidation is effective in preventing a decrease in the formation of martensite on a surface of a steel sheet and improving collision characteristics. However, a Sb or Sn content of more than 1.0% may result in poor collision characteristics due to grain boundary embrittlement. Thus, when Sb or Sn is contained, the Sb content or the Sn content is preferably 1.0% or less. More preferably, the Sb content or the Sn content is 0.9% or less. The advantages of the disclosed embodiments can be achieved even at a low Sb or Sn content. Thus, the Sb or Sn content may have any lower limit. To more effectively produce the effects of improving collision characteristics, the Sb content or the Sn content is preferably 0.005% or more. More preferably, the Sb content or the Sn content is 0.01% or more.

Ca and REM are elements effective in improving workability by morphological control of sulfide. However, a Ca or REM content of more than 0.005% may result in adverse effects on the cleanliness of steel and poor characteristics. Thus, when Ca or REM is contained, the Ca or REM content is preferably 0.005% or less. More preferably, the Ca content or the REM content is 0.004% or less. The advantages of the disclosed embodiments can be achieved even at a low Ca or REM content. Thus, the Ca or REM content may have any lower limit. To more effectively produce the effects of improving workability, the Ca or REM content is preferably 0.001% or more. More preferably, the Ca content or the REM content is 0.002% or more.

These optional elements, if contained below the appropriate lower limits described above, are contained as incidental impurities.

An embodiment of a method for producing a steel sheet according to the disclosed embodiments is described in detail below. Unless otherwise specified, the temperature at which a steel slab (steel material), a steel sheet, or the like described below is heated or cooled refers to the surface temperature of the steel slab (steel material), the steel sheet, or the like.

A method for producing a steel sheet according to the disclosed embodiments includes, for example, a hot-rolling step of hot-rolling a steel slab with such a chemical composition as described above at a finish rolling temperature in the range of 850° C. to 950° C. and coiling the hot-rolled steel sheet at a coiling temperature of 600° C. or less, a cold-rolling step of cold-rolling the hot-rolled steel sheet after the hot-rolling step at a rolling reduction of more than 20%, an annealing step of heating the cold-rolled steel sheet after the cold-rolling step to an annealing temperature of 750° C. or more and holding the steel sheet for 30 seconds or more, a quenching step of cooling the steel sheet at an average cooling rate of 20° C./s or more in a temperature range of the annealing temperature to a martensite transformation start temperature Ms and then cooling the steel sheet from the martensite transformation start temperature Ms to a finish cooling temperature in the range of (Ms-250° C.) to (Ms-50° C.) at an average cooling rate in the range of 2° C./s to 15° C./s, a tempering step of holding the steel sheet in the temperature range of 300° C. to 500° C. for 20 seconds or more, and a heat-treatment step of holding the steel sheet in the temperature range of 100° C. to 300° C. for 20 seconds or more after the tempering step. A method for producing a steel sheet according to the disclosed embodiments may include a coating step of applying electrogalvanizing, hot-dip galvanizing, or hot-dip galvannealing to a surface of the steel sheet after the tempering step and before the heat-treatment step. A steel slab for use in a method for producing a steel sheet according to the disclosed embodiments has a chemical composition satisfying an equivalent carbon content Ceq of 0.60% or more and less than 0.85%. The equivalent carbon content Ceq of 0.60% or more and less than 0.85% is an optimum range for producing a steel sheet according to the disclosed embodiments under the production conditions of the embodiments.

First, each condition in the hot-rolling step is described.

Finish rolling temperature: 850° C. to 950° C.

A finish rolling temperature of less than 850° C. may result in ferrite transformation while rolling, locally decreased strength, and low strength even with a microstructure of the disclosed embodiments. Thus, the finish rolling temperature is 850° C. or more, preferably 880° C. or more. On the other hand, a finish rolling temperature of more than 950° C. may result in coarse crystal grains and low strength even with a microstructure of the disclosed embodiments. Thus, the finish rolling temperature is 950° C. or less, preferably 930° C. or less.

Coiling Temperature: 600° C. or Less

A coiling temperature of more than 600° C. may result in coarse carbide in a hot-rolled steel sheet, and such coarse carbide sometimes does not melt completely while soaking in annealing. Thus, the hot-rolled steel sheet may have insufficient strength. Thus, the coiling temperature is 600° C. or less, preferably 580° C. or less. The coiling temperature may have any lower limit but is preferably 400° C. or more to prevent the formation of a steel sheet in poor shape and an excessively hard steel sheet.

A hot-rolled steel sheet produced in the hot-rolling step is typically subjected to preliminary treatment, such as pickling or degreasing, by a known method and is then cold-rolled if necessary. Conditions for cold-rolling in the cold-rolling step are described below.

Rolling Reduction in Cold-Rolling: More than 20%

When the rolling reduction in the cold-rolling is 20% or less, recrystallization of ferrite is not promoted, unrecrystallized ferrite remains, and a steel microstructure of the disclosed embodiments may not be formed. Thus, the rolling reduction in the cold-rolling is more than 20%, preferably 30% or more.

Next, conditions in the annealing step of annealing a cold-rolled steel sheet produced in the cold-rolling step are described.

Annealing Temperature: 750° C. or More, Holding Time: 30 Seconds or More

An annealing temperature of less than 750° C. results in insufficient austenite formation and excessive ferrite formation. Thus, a steel microstructure of the disclosed embodiments cannot be formed. Thus, the annealing temperature is 750° C. or more. The upper limit of the annealing temperature is preferably, but not limited to, 890° C. or less. An annealing temperature of more than 890° C. may result in excessive austenite, insufficient ferrite, excessive bainite, and consequently low fracture resistance. Thus, the annealing temperature is preferably 890° C. or less. A holding time of less than 30 seconds results in insufficient austenite formation and excessive ferrite formation. Thus, a steel microstructure of the disclosed embodiments cannot be formed. Thus, the holding time is 30 seconds or more, preferably 60 seconds or more. The holding time may have any upper limit but is preferably 600 seconds or less in terms of productivity.

After the annealing step, quenching is performed. Conditions in the quenching step are described below.

Average Cooling Rate in the Temperature Range of the Annealing Temperature to the Martensite Transformation Start Temperature Ms: 20° C./s or More The fracture resistance of the disclosed embodiments cannot be achieved at an average cooling rate of less than 20° C./s. The reason is not clear but may be as follows: a cooling rate of less than 20° C./s results in excessive formation of ferrite or bainite while cooling and a lower martensite transformation start temperature Ms. This results in a decrease in the amount of martensite transformation when cooling is stopped, martensite transformation at a lower temperature, and consequently insufficient tempering of martensite while cooling as compared with the case where the Ms temperature is high. This reduces the effect of reducing the hardness difference by the tempered martensite, prevents the tempered martensite from deforming with the ferrite in the primary processing, easily forms a void, and sometimes impairs collision characteristics. Thus, the average cooling rate is 20° C./s or more. Ms can be determined using the following formula.

$$Ms(°\ C.)=539-423\times\{[C\ \%]\times100/(100-[\alpha\%\ \text{by area}])\}-30\times[Mn\ \%]-12\times[Cr\ \%]-18\times[Ni\ \%]-8\times[Mo\ \%]$$

Each element symbol in the formula represents the element content (% by mass) and is 0 for an element not contained.

[α % by area] represents the ferrite area fraction after annealing. The ferrite area fraction after annealing is determined in advance by simulating the heating rate, the annealing temperature, and the holding time for the annealing with a thermodilatometer.

After the annealing, rapid cooling is preferably performed at the highest possible cooling rate, and the average cooling rate in the temperature range of the annealing temperature to the martensite transformation start temperature Ms is more preferably 30° C./s or more. The upper limit of the average cooling rate is preferably, but not limited to, 200° C./s or less in terms of production costs.

Average Cooling Rate from Martensite Transformation Start Temperature Ms to Finish Cooling Temperature: 2° C./s to 15° C./s An average cooling rate of less than 2° C./s results in excessive formation of carbide-containing bainite while cooling, and a steel microstructure and fracture resistance of the disclosed embodiments cannot be achieved. Thus, the average cooling rate is 2° C./s or more, preferably 5° C./s or more. On the other hand, when cooling is performed at an average cooling rate of more than 15° C./s, the fracture resistance of the disclosed embodiments cannot be achieved. The reason is not clear but may be as follows: a cooling rate of 15° C./s or less results in a longer time from the Ms temperature to the finish cooling temperature, tempering of martensite even while cooling, and a larger effect of reducing the hardness difference by the tempered martensite. This effect cannot be produced at a cooling rate of more than 15° C./s. Thus, the tempered martensite does not deform with ferrite in the primary processing, a void is easily formed, and collision characteristics are deteriorated. Thus, the average cooling rate is 15° C./s or less, preferably 10° C./s or less.

Finish Cooling Temperature: (Ms−250° C.) to (Ms−50° C.)

At a finish cooling temperature of more than (Ms−50° C.), tempered martensite is insufficiently formed, and a steel microstructure of the disclosed embodiments cannot be formed. Thus, the finish cooling temperature is (Ms−50° C.) or less, preferably (Ms−100° C.) or less. On the other hand, a finish cooling temperature of less than (Ms−250° C.) may result in excessive tempered martensite and insufficient formation of retained austenite. Thus, the finish cooling temperature is (Ms−250° C.) or more, preferably (Ms−200° C.) or more.

After the quenching step, tempering is performed. Conditions in the tempering step are described below.

Tempering Temperature: 300° C. to 500° C., Holding Time: 20 Seconds or More

At less than 300° C., martensite is insufficiently tempered, tempered martensite does not deform with ferrite in the primary processing, a void is easily formed, and collision characteristics are deteriorated. Furthermore, bainite transformation may be insufficient, a preferred amount of bainite to improve fracture resistance may not be formed, and the fracture resistance may be reduced. Thus, the tempering temperature is 300° C. or more, preferably 350° C. or more. On the other hand, at more than 500° C., ferrite is excessively formed, and a steel microstructure of the disclosed embodiments may not be formed. Furthermore, bainite transformation may be insufficient, a preferred amount of bainite to improve fracture resistance may not be formed, and the fracture resistance may be reduced. Thus, the tempering temperature is 500° C. or less, preferably 450° C. or less. At a holding time of less than 20 seconds, martensite is insufficiently tempered, and the fracture resistance of the disclosed embodiments cannot be achieved. Furthermore, bainite transformation may be insufficient, a preferred amount of bainite to improve fracture resistance may not be formed, and the fracture resistance may be reduced. Thus, the holding time is 20 seconds or more, preferably 30 seconds or more. The holding time may have any upper limit but is preferably 500 seconds or less in terms of productivity and to prevent excessive bainite transformation.

Holding Temperature after the Tempering Step: 100° C. to 300° C., Holding Time: 20 Seconds or More A method for producing a steel sheet according to the disclosed embodiments includes the heat-treatment step of holding the steel sheet in the temperature range of 100° C. to 300° C. for 20 seconds or more after the tempering step. At a holding temperature of less than 100° C. or more than 300° C., or at a holding time of less than 20 seconds, a steel microstructure and fracture resistance of the disclosed embodiments cannot be achieved. The reason is not clear but may be as follows: at less than 100° C., martensite formed while cooling after the tempering step is insufficiently tempered, tempered martensite does not deform with ferrite in the primary processing, a void is easily formed, and consequently collision characteristics are deteriorated. Thus, the holding temperature is 100° C. or more, preferably 150° C. or more. On the other hand, at a holding temperature of more than 300° C., a small amount of martensite may be formed while holding, and martensite formed while cooling after the holding is not tempered and remains as fresh martensite in the final microstructure. Thus, a steel microstructure and collision characteristics of the disclosed embodiments cannot be achieved. At a holding temperature of more than 300° C., bainite transformation may proceed, and a steel microstructure of the disclosed embodiments may not be formed. Thus, the holding temperature is 300° C. or less, preferably 250° C. or less. At a holding time of less than 20 seconds, martensite formed while cooling after the tempering step is insufficiently tempered, and the collision characteristics of the disclosed embodiments may not be achieved. Thus, the holding time is 20 seconds or more, preferably 30 seconds or more. The holding in the temperature range of 100° C. to 300° C. may be performed after cooling to the temperature range of 100° C. to 300° C. after the tempering step or may be performed after cooling to less than 100° C. after the tempering step and then reheating to the temperature range of 100° C. to 300° C.

In a series of heat treatment in a production method according to the disclosed embodiments, the holding temperature may vary in the temperature range described above. The cooling rate while cooling may also vary in a specified range without departing from the gist of the disclosed embodiments. A steel sheet may be heat-treated in any facility provided that the thermal history is satisfied.

Next, conditions in the coating step are described below.

In a method for producing a steel sheet according to the disclosed embodiments, electrogalvanizing, hot-dip galvanizing, or hot-dip galvannealing may be applied to a surface of the steel sheet after the tempering step and before the heat-treatment step.

The electrogalvanizing treatment is preferably performed by passing an electric current in a zinc solution in the temperature range of 50° C. to 60° C. The hot-dip galvanizing treatment is preferably performed by immersing a steel sheet produced as described above in a galvanizing bath in the temperature range of 440° C. to 500° C. The coating weight is then preferably adjusted by gas wiping or the like. The hot-dip galvanizing treatment step may be followed by an alloying step of performing alloying treatment. When zinc coating is subjected to alloying treatment, the zinc coating is preferably held in the temperature range of 450° C. to 580° C. for 1 to 40 seconds.

A steel sheet subjected to hot-dip galvanizing treatment or hot-dip galvannealing treatment may be subjected to temper rolling for shape correction, surface roughness adjustment, or the like. In the temper rolling, a temper rolling reduction of more than 0.5% may result in lower bendability due to surface hardening. Thus, the temper rolling reduction is preferably 0.5% or less, more preferably 0.3% or less. It is also possible to apply coating treatment, such as resin or oil coating.

Other conditions of a production method are not particularly limited but are preferably the following conditions.

A slab is preferably produced by continuous casting to prevent macrosegregation and may be produced by ingot casting or thin slab casting. To hot-roll a slab, the slab may be cooled to room temperature and then reheated for hot-rolling. A slab may be hot-rolled in a furnace without cooling to room temperature. An energy-saving process of hot-rolling a slab immediately after lightly conserving heat is also applicable. When a slab is heated, the slab is preferably heated to 1100° C. or more to prevent an increase in rolling force and dissolve carbides. A slab is preferably heated to 1300° C. or less to prevent an increase in scale loss.

When a slab is hot-rolled, to prevent troubles while rolling at a low slab heating temperature, a rough bar after rough rolling may be heated. A continuous rolling process of joining rough bars together and continuously finish-rolling the rough bars is also applicable. To reduce rolling force or make the shape and material quality uniform, rolling with lubrication at a friction coefficient in the range of 0.10 to 0.25 is preferably performed in all or part of the passes of finish rolling.

Scales may be removed by pickling or the like from a steel sheet after coiling. After pickling, cold-rolling, annealing, and galvanization are performed under the conditions described above.

Next, a member according to the disclosed embodiments and a method for producing the member are described below.

A member according to the disclosed embodiments is produced by performing at least one of forming and welding on a steel sheet according to the disclosed embodiments. A method for producing a member according to the disclosed embodiments includes the step of performing at least one of forming and welding on a steel sheet produced by a method for producing a steel sheet according to embodiments.

A steel sheet according to the disclosed embodiments has high strength and good collision characteristics. Thus, a member produced by using a steel sheet according to the disclosed embodiments also has high strength, good collision characteristics, and is less likely to be broken in collision deformation. Thus, a member according to the disclosed embodiments can be suitably used as an energy-absorbing member in an automotive part.

The forming may be any typical processing method, such as press forming. The welding may be any typical welding, such as spot welding or arc welding.

EXAMPLES

The disclosed embodiments are more specifically described with reference to examples. The scope of the disclosure is not intended to be limited to the following examples.

Example 1

A steel with the chemical composition shown in Table 1 was obtained by steelmaking in a vacuum melting furnace and was then bloomed into a steel slab. These steel slabs were heated and subjected to hot-rolling, cold-rolling, annealing, quenching, tempering, and heat treatment under the conditions shown in Table 2 to produce steel sheets. When steel sheets were produced under the conditions shown in Table 2, some of the steel sheets were subjected to coating treatment after the tempering step. In electrogalvanizing treatment, an electric current is passing through a steel sheet immersed in a zinc solution to form an electrogalvanized layer (EG) with a coating weight in the range of 10 to 100 $g/m^2$. In hot-dip galvanizing treatment, a steel sheet was immersed in a coating bath to form a hot-dip galvanized layer (GI) with a coating weight in the range of 10 to 100 $g/m^2$. In hot-dip galvannealing, after a hot-dip galvanized layer was formed on a steel sheet, an alloying treatment was performed to form a hot-dip galvannealed layer (GA). Each steel sheet had a final thickness of 1.2 mm.

TABLE 1

| | Chemical composition (mass %) | | | | | | | | | |
|---|---|---|---|---|---|---|---|---|---|---|
| Steel | C | Si | Mn | P | S | sol.Al | N | Cr | Mo | V |
| A | 0.12 | 1.5 | 2.7 | 0.008 | 0.010 | 0.030 | 0.003 | 0 | 0.1 | 0 |
| B | 0.07 | 1.8 | 3.4 | 0.030 | 0.010 | 0.021 | 0.002 | 0 | 0 | 0 |
| C | 0.20 | 1.2 | 2.2 | 0.040 | 0.020 | 0.044 | 0.010 | 0 | 0 | 0 |
| D | 0.09 | 0.1 | 3.4 | 0.020 | 0.010 | 0.090 | 0.004 | 0 | 0 | 0 |
| E | 0.10 | 2.0 | 3.2 | 0.010 | 0.010 | 0.012 | 0.002 | 0 | 0 | 0 |
| F | 0.19 | 1.8 | 2.0 | 0.010 | 0.030 | 0.028 | 0.005 | 0 | 0 | 0 |
| G | 0.10 | 0.8 | 3.5 | 0.030 | 0.010 | 0.075 | 0.002 | 0 | 0 | 0 |
| H | 0.13 | 0.6 | 3.2 | 0.050 | 0.010 | 0.062 | 0.006 | 0 | 0 | 0 |
| I | 0.14 | 1.3 | 3.1 | 0.040 | 0.050 | 0.029 | 0.006 | 0 | 0 | 0 |
| J | 0.17 | 1.7 | 2.6 | 0.030 | 0.010 | 0.005 | 0.002 | 0 | 0 | 0 |
| K | 0.14 | 1.6 | 2.9 | 0.010 | 0.030 | 0.100 | 0.001 | 0 | 0 | 0 |
| L | 0.08 | 0.9 | 3.3 | 0.020 | 0.010 | 0.061 | 0.002 | 0.005 | 0 | 0 |

TABLE 1-continued

| Steel | | | | | | | | | | |
|---|---|---|---|---|---|---|---|---|---|---|
| M | 0.16 | 1.1 | 2.6 | 0.010 | 0.010 | 0.012 | 0.002 | 1.0 | 0 | 0 |
| N | 0.11 | 1.5 | 3.0 | 0.010 | 0.020 | 0.023 | 0.003 | 0 | 0.005 | 0 |
| O | 0.13 | 1.4 | 3.0 | 0.030 | 0.010 | 0.009 | 0.006 | 0 | 0.5 | 0 |
| P | 0.16 | 1.9 | 2.7 | 0.010 | 0.010 | 0.011 | 0.005 | 0 | 0 | 0.005 |
| Q | 0.15 | 1.2 | 2.6 | 0.010 | 0.020 | 0.034 | 0.007 | 0 | 0 | 0.5 |
| R | 0.12 | 0.3 | 3.2 | 0.020 | 0.040 | 0.092 | 0.005 | 0 | 0.05 | 0 |
| S | 0.19 | 1.5 | 2.6 | 0.010 | 0.030 | 0.029 | 0.002 | 0 | 0 | 0 |
| T | 0.11 | 1.6 | 3.1 | 0.010 | 0.010 | 0.021 | 0.006 | 0 | 0 | 0 |
| U | 0.15 | 1.8 | 2.7 | 0.020 | 0.020 | 0.009 | 0.008 | 0.02 | 0 | 0 |
| V | 0.12 | 1.5 | 3.2 | 0.010 | 0.010 | 0.019 | 0.001 | 0 | 0 | 0 |
| W | 0.14 | 1.4 | 2.6 | 0.030 | 0.010 | 0.035 | 0.003 | 0 | 0 | 0.006 |
| X | 0.16 | 1.1 | 2.6 | 0.020 | 0.010 | 0.050 | 0.005 | 0 | 0.1 | 0 |
| Y | 0.19 | 1.0 | 2.7 | 0.010 | 0.030 | 0.045 | 0.008 | 0 | 0 | 0 |
| Z | 0.17 | 0.9 | 3.1 | 0.020 | 0.040 | 0.058 | 0.007 | 0 | 0 | 0 |
| AA | 0.14 | 0.3 | 3.4 | 0.010 | 0.010 | 0.049 | 0.003 | 0 | 0 | 0 |
| AB | 0.13 | 1.4 | 3.0 | 0.010 | 0.010 | 0.033 | 0.004 | 0 | 0.04 | 0 |
| AC | 0.15 | 1.5 | 2.9 | 0.030 | 0.030 | 0.026 | 0.002 | 0 | 0 | 0 |
| AD | 0.05 | 1.8 | 2.9 | 0.040 | 0.040 | 0.022 | 0.002 | 0 | 0.009 | 0 |
| AE | 0.21 | 1.1 | 2.7 | 0.010 | 0.010 | 0.045 | 0.003 | 0 | 0 | 0 |
| AF | 0.13 | 0.04 | 2.7 | 0.010 | 0.010 | 0.037 | 0.008 | 0.03 | 0 | 0 |
| AG | 0.11 | 0.9 | 1.9 | 0.020 | 0.010 | 0.072 | 0.002 | 0 | 0 | 0.01 |
| AH | 0.19 | 1.6 | 3.6 | 0.030 | 0.010 | 0.064 | 0.003 | 0 | 0 | 0 |
| AI | 0.17 | 1.2 | 2.7 | 0.060 | 0.010 | 0.039 | 0.006 | 0 | 0 | 0 |
| AJ | 0.12 | 1.0 | 2.9 | 0.010 | 0.060 | 0.021 | 0.002 | 0 | 0.01 | 0 |
| AK | 0.08 | 1.7 | 2.4 | 0.010 | 0.020 | 0.110 | 0.001 | 0 | 0 | 0 |

| | Chemical composition (mass %) | | | | | | | | | Ceq |
|---|---|---|---|---|---|---|---|---|---|---|
| Steel | Ti | Nb | B | Ni | Cu | Sb | Sn | Ca | REM | (%) |
| A | 0.02 | 0 | 0.002 | 0 | 0 | 0 | 0 | 0 | 0 | 0.66 |
| B | 0 | 0 | 0 | 0 | 0 | 0 | 0 | 0 | 0 | 0.71 |
| C | 0 | 0 | 0 | 0 | 0 | 0 | 0 | 0 | 0 | 0.62 |
| D | 0 | 0 | 0 | 0 | 0 | 0 | 0 | 0 | 0 | 0.66 |
| E | 0 | 0 | 0 | 0 | 0 | 0 | 0 | 0 | 0 | 0.72 |
| F | 0 | 0 | 0 | 0 | 0 | 0 | 0 | 0 | 0 | 0.60 |
| G | 0 | 0 | 0 | 0 | 0 | 0 | 0 | 0 | 0 | 0.72 |
| H | 0 | 0 | 0 | 0 | 0 | 0 | 0 | 0 | 0 | 0.69 |
| I | 0 | 0 | 0 | 0 | 0 | 0 | 0 | 0 | 0 | 0.71 |
| J | 0 | 0 | 0 | 0 | 0 | 0 | 0 | 0 | 0 | 0.67 |
| K | 0 | 0 | 0 | 0 | 0 | 0 | 0 | 0 | 0 | 0.69 |
| L | 0 | 0 | 0 | 0 | 0.01 | 0 | 0 | 0 | 0 | 0.67 |
| M | 0 | 0.007 | 0 | 0 | 0 | 0 | 0 | 0 | 0 | 0.84 |
| N | 0 | 0 | 0.003 | 0 | 0 | 0.005 | 0 | 0 | 0 | 0.67 |
| O | 0.01 | 0 | 0 | 0 | 0 | 0 | 0 | 0 | 0 | 0.81 |
| P | 0 | 0 | 0 | 0 | 0 | 0 | 1.0 | 0 | 0 | 0.69 |
| Q | 0 | 0 | 0 | 0.01 | 0 | 0 | 0 | 0 | 0 | 0.67 |
| R | 0.005 | 0 | 0 | 0 | 0 | 0 | 0 | 0 | 0.004 | 0.68 |
| S | 0.5 | 0 | 0 | 0.002 | 0 | 0 | 0 | 0 | 0 | 0.69 |
| T | 0 | 0.005 | 0 | 0 | 0 | 1.0 | 0 | 0 | 0 | 0.69 |
| U | 0 | 0.5 | 0 | 0 | 0 | 0 | 0 | 0 | 0 | 0.68 |
| V | 0 | 0 | 0.0003 | 0.02 | 0 | 0 | 0 | 0 | 0 | 0.72 |
| W | 0 | 0 | 0.005 | 0 | 0 | 0 | 0.005 | 0 | 0 | 0.63 |
| X | 0 | 0 | 0 | 0.005 | 0 | 0 | 0 | 0 | 0 | 0.66 |
| Y | 0 | 0.03 | 0 | 1.0 | 0 | 0 | 0 | 0 | 0 | 0.71 |
| Z | 0.04 | 0 | 0 | 0 | 0.005 | 0 | 0 | 0 | 0 | 0.72 |
| AA | 0 | 0 | 0 | 0 | 1.0 | 0 | 0 | 0 | 0.005 | 0.72 |
| AB | 0.02 | 0 | 0 | 0 | 0 | 0 | 0 | 0.001 | 0 | 0.70 |
| AC | 0 | 0 | 0 | 0.01 | 0 | 0 | 0 | 0.005 | 0 | 0.70 |
| AD | 0 | 0 | 0 | 0 | 0 | 0 | 0 | 0 | 0 | 0.61 |
| AE | 0.02 | 0 | 0 | 0 | 0.008 | 0 | 0 | 0 | 0 | 0.71 |
| AF | 0 | 0 | 0 | 0.05 | 0 | 0 | 0 | 0 | 0 | 0.59 |
| AG | 0 | 0 | 0 | 0 | 0 | 0 | 0 | 0 | 0 | 0.46 |
| AH | 0 | 0.002 | 0 | 0 | 0.03 | 0 | 0 | 0 | 0 | 0.86 |
| AI | 0 | 0.1 | 0 | 0 | 0 | 0 | 0 | 0 | 0 | 0.67 |
| AJ | 0.04 | 0 | 0 | 0 | 0 | 0 | 0 | 0 | 0 | 0.65 |
| AK | 0 | 0 | 0 | 0 | 0 | 0 | 0 | 0 | 0 | 0.55 |

Ceq: equivalent carbon content
Remainder other than the chemical composition above: Fe and incidental impurities

TABLE 2

| Steel sheet No. | Type of steel | Hot-rolling Finish rolling temperature (°C) | Hot-rolling Coiling temperature (°C) | Cold-rolling Rolling reduction (%) | Annealing Temperature (°C) | Annealing Holding time | *1 (°C/s) | Ms (°C) | Quenching *2 (°C/s) | *3 (°C) | Ms-50 (°C) | Ms-250 (°C) | Tempering Temperature (°C) | Tempering Holding time (s) | Heat treatment Holding pattern | Heat treatment Temperature (°C) | Heat treatment Holding time (s) | Coating | Note |
|---|---|---|---|---|---|---|---|---|---|---|---|---|---|---|---|---|---|---|---|
| 1 | A | 900 | 550 | 50 | 800 | 100 | 40 | 381 | 5 | 200 | 331 | 131 | 400 | 50 | *5 | 200 | 60 | GA | Example |
| 2 | A | 850 | 570 | 35 | 810 | 190 | 82 | 385 | 8 | 190 | 335 | 135 | 370 | 110 | *4 | 220 | 150 | GI | Example |
| 3 | A | 950 | 540 | 45 | 840 | 480 | 81 | 393 | 10 | 180 | 343 | 143 | 320 | 70 | *5 | 170 | 40 | — | Example |
| 4 | A | 870 | 600 | 70 | 820 | 150 | 42 | 388 | 7 | 160 | 338 | 138 | 360 | 120 | *5 | 230 | 120 | GA | Example |
| 5 | A | 920 | 540 | 50 | 750 | 410 | 71 | 374 | 12 | 180 | 324 | 124 | 320 | 60 | *4 | 110 | 70 | GI | Example |
| 6 | A | 880 | 570 | 30 | 840 | 30 | 73 | 393 | 9 | 210 | 343 | 143 | 340 | 170 | *4 | 230 | 150 | EG | Example |
| 7 | A | 880 | 590 | 65 | 800 | 360 | 20 | 381 | 6 | 200 | 331 | 131 | 380 | 80 | *5 | 130 | 100 | GA | Example |
| 8 | A | 940 | 550 | 40 | 830 | 320 | 23 | 390 | 2 | 220 | 340 | 140 | 350 | 50 | *5 | 170 | 200 | GI | Example |
| 9 | A | 890 | 580 | 60 | 880 | 270 | 35 | 401 | 15 | 170 | 351 | 151 | 440 | 110 | *5 | 190 | 80 | — | Example |
| 10 | A | 850 | 480 | 35 | 850 | 250 | 64 | 395 | 6 | 170 | 345 | 145 | 410 | 490 | *5 | 250 | 140 | GA | Example |
| 11 | A | 900 | 560 | 40 | 810 | 160 | 79 | 385 | 8 | 140 | 335 | 135 | 420 | 80 | *5 | 210 | 60 | EG | Example |
| 12 | A | 880 | 510 | 60 | 790 | 90 | 53 | 378 | 7 | 170 | 328 | 128 | 300 | 410 | *5 | 280 | 300 | — | Example |
| 13 | A | 900 | 580 | 30 | 860 | 440 | 51 | 397 | 12 | 230 | 347 | 147 | 500 | 260 | *5 | 260 | 50 | GA | Example |
| 14 | A | 910 | 500 | 55 | 790 | 150 | 46 | 378 | 5 | 200 | 328 | 128 | 390 | 20 | *5 | 220 | 40 | GI | Example |
| 15 | A | 870 | 470 | 70 | 820 | 210 | 47 | 388 | 8 | 260 | 338 | 138 | 440 | 140 | *4 | 100 | 120 | — | Example |
| 16 | A | 930 | 490 | 60 | 870 | 120 | 30 | 400 | 10 | 330 | 350 | 150 | 410 | 70 | *5 | 300 | 160 | EG | Example |
| 17 | A | 910 | 530 | 45 | 810 | 190 | 66 | 385 | 10 | 190 | 335 | 135 | 330 | 90 | *5 | 180 | 20 | GI | Example |
| 18 | A | 890 | 520 | 70 | 820 | 370 | 35 | 396 | 8 | 300 | 346 | 146 | 450 | 320 | *4 | 250 | 280 | — | Comparative example |
| 19 | B | 840 | 570 | 50 | 789 | 310 | 77 | 391 | 11 | 210 | 341 | 141 | 460 | 210 | *5 | 210 | 220 | GA | Comparative example |
| 20 | B | 920 | 460 | 45 | 800 | 220 | 56 | 347 | 6 | 110 | 297 | 97 | 370 | 150 | *4 | 200 | 100 | GI | Example |
| 21 | C | 950 | 530 | 65 | 800 | 330 | 51 | 349 | 10 | 230 | 299 | 99 | 420 | 50 | *5 | 180 | 60 | EG | Comparative example |
| 22 | D | 920 | 450 | 30 | 830 | 200 | 80 | 387 | 7 | 270 | 337 | 137 | 380 | 130 | *4 | 190 | 180 | GA | Example |
| 23 | D | 860 | 610 | 40 | 780 | 110 | 31 | 376 | 9 | 220 | 326 | 126 | 480 | 360 | *4 | 260 | 390 | GI | Comparative example |
| 24 | D | 930 | 460 | 75 | 780 | 490 | 39 | 374 | 5 | 300 | 324 | 124 | 370 | 440 | *5 | 170 | 240 | — | Example |
| 25 | E | 900 | 540 | 30 | 740 | 150 | 42 | 357 | 8 | 230 | 307 | 107 | 420 | 110 | *5 | 120 | 80 | GA | Comparative example |
| 26 | F | 870 | 560 | 50 | 820 | 130 | 55 | 369 | 9 | 280 | 319 | 119 | 390 | 100 | *5 | 280 | 150 | EG | Example |
| 27 | F | 940 | 510 | 65 | 770 | 25 | 25 | 340 | 8 | 100 | 290 | 90 | 320 | 70 | *4 | 230 | 50 | — | Comparative example |
| 28 | G | 880 | 450 | 40 | 810 | 400 | 63 | 374 | 6 | 250 | 324 | 124 | 410 | 360 | *5 | 200 | 360 | GA | Comparative example |
| 29 | G | 930 | 490 | 55 | 760 | 130 | 18 | 357 | 7 | 280 | 307 | 107 | 340 | 120 | *4 | 230 | 90 | GI | Comparative example |
| 30 | H | 880 | 470 | 50 | 860 | 430 | 41 | 378 | 10 | 200 | 328 | 128 | 370 | 50 | *5 | 180 | 170 | — | Example |
| 31 | H | 900 | 530 | 35 | 890 | 200 | 62 | 385 | 1 | 180 | 335 | 135 | 460 | 130 | *5 | 290 | 40 | GA | Comparative example |
| 32 | I | 930 | 580 | 55 | 830 | 450 | 46 | 368 | 11 | 190 | 318 | 118 | 480 | 110 | *5 | 190 | 100 | GI | Example |
| 33 | I | 870 | 540 | 60 | 870 | 150 | 55 | 379 | 18 | 190 | 329 | 129 | 430 | 220 | *4 | 130 | 70 | — | Comparative example |
| 34 | J | 890 | 480 | 50 | 800 | 260 | 41 | 354 | 6 | 130 | 304 | 104 | 370 | 100 | *5 | 140 | 110 | GA | Example |
| 35 | J | 920 | 500 | 55 | 780 | 350 | 36 | 345 | 13 | 330 | 295 | 95 | 450 | 330 | *5 | 200 | 310 | GI | Comparative example |
| 36 | K | 880 | 550 | 30 | 840 | 70 | 37 | 377 | 6 | 150 | 327 | 127 | 410 | 150 | *4 | 220 | 160 | — | Example |
| 37 | K | 930 | 550 | 45 | 850 | 480 | 55 | 380 | 8 | 120 | 330 | 130 | 390 | 260 | *4 | 180 | 40 | GI | Comparative example |
| 38 | L | 890 | 520 | 60 | 880 | 370 | 35 | 403 | 5 | 180 | 353 | 153 | 380 | 60 | *5 | 140 | 130 | GA | Example |
| 39 | L | 860 | 490 | 40 | 810 | 110 | 72 | 392 | 7 | 190 | 342 | 142 | 270 | 90 | *5 | 180 | 60 | — | Comparative example |
| 40 | M | 920 | 570 | 65 | 790 | 550 | 44 | 340 | 4 | 110 | 290 | 90 | 420 | 310 | *5 | 120 | 180 | GI | Example |
| 41 | M | 910 | 480 | 45 | 790 | 260 | 25 | 318 | 9 | 160 | 268 | 68 | 520 | 500 | *4 | 150 | 330 | GI | Comparative example |

TABLE 2-continued

| Steel sheet No. | Type of steel | Hot-rolling Finish rolling temperature (°C.) | Hot-rolling Coiling temperature (°C.) | Cold-rolling Rolling reduction (%) | Annealing Temperature (°C.) | Annealing Holding time | *1 (°C./s) | Ms (°C.) | *2 (°C./s) | *3 (°C.) | Ms-50 (°C.) | Ms-250 (°C.) | Tempering Temperature (°C.) | Tempering Holding time (s) | Heat treatment Holding pattern | Heat treatment Temperature (°C.) | Heat treatment Holding time (s) | Coating | Note |
|---|---|---|---|---|---|---|---|---|---|---|---|---|---|---|---|---|---|---|---|
| 42 | N | 880 | 520 | 55 | 800 | 390 | 48 | 380 | 6 | 290 | 330 | 130 | 380 | 50 | *5 | 210 | 60 | EG | Example |
| 43 | N | 880 | 550 | 45 | 870 | 330 | 32 | 396 | 10 | 200 | 346 | 146 | 400 | 18 | *4 | 190 | 150 | GA | Comparative example |
| 44 | O | 900 | 590 | 60 | 810 | 210 | 51 | 366 | 9 | 290 | 316 | 116 | 310 | 180 | *4 | 240 | 110 | GI | Example |
| 45 | O | 910 | 560 | 60 | 790 | 160 | 46 | 359 | 8 | 120 | 309 | 109 | 400 | 70 | *5 | 80 | 90 | — | Comparative example |
| 46 | P | 890 | 510 | 35 | 890 | 200 | 35 | 357 | 12 | 120 | 307 | 107 | 420 | 100 | *4 | 200 | 370 | GI | Example |
| 47 | P | 870 | 530 | 60 | 760 | 250 | 31 | 352 | 5 | 120 | 302 | 102 | 350 | 140 | *5 | 320 | 250 | GI | Comparative example |
| 48 | Q | 890 | 500 | 50 | 790 | 280 | 44 | 381 | 11 | 180 | 331 | 131 | 370 | 440 | *5 | 280 | 210 | EG | Example |
| 49 | Q | 900 | 470 | 70 | 840 | 330 | 38 | 386 | 8 | 220 | 336 | 136 | 420 | 50 | *4 | 170 | 18 | GA | Comparative example |
| 50 | S | 920 | 550 | 45 | 850 | 120 | 54 | 376 | 7 | 260 | 326 | 126 | 410 | 300 | *5 | 150 | 60 | GI | Example |
| 51 | S | 900 | 490 | 40 | 830 | 220 | 51 | 363 | 8 | 280 | 313 | 113 | 430 | 110 | *4 | 200 | 220 | EG | Example |
| 52 | T | 870 | 550 | 30 | 850 | 210 | 60 | 393 | 7 | 230 | 343 | 143 | 420 | 50 | *5 | 210 | 280 | GA | Example |
| 53 | U | 890 | 450 | 70 | 870 | 250 | 45 | 371 | 10 | 220 | 321 | 121 | 440 | 400 | *4 | 190 | 50 | GI | Example |
| 54 | V | 900 | 580 | 65 | 820 | 160 | 36 | 367 | 13 | 180 | 317 | 117 | 420 | 70 | *5 | 260 | 140 | — | Example |
| 55 | W | 930 | 510 | 35 | 770 | 410 | 57 | 364 | 14 | 170 | 314 | 114 | 310 | 50 | *5 | 240 | 350 | GI | Example |
| 56 | X | 870 | 560 | 65 | 780 | 320 | 23 | 354 | 8 | 270 | 304 | 104 | 390 | 520 | *4 | 200 | 240 | GA | Example |
| 57 | Y | 910 | 520 | 60 | 790 | 270 | 42 | 330 | 6 | 270 | 280 | 80 | 460 | 60 | *5 | 180 | 80 | — | Example |
| 58 | Z | 920 | 470 | 45 | 820 | 330 | 54 | 339 | 5 | 190 | 289 | 89 | 350 | 120 | *5 | 230 | 310 | GA | Example |
| 59 | AA | 910 | 540 | 40 | 800 | 150 | 49 | 365 | 11 | 300 | 315 | 115 | 430 | 160 | *4 | 260 | 100 | EG | Example |
| 60 | AB | 880 | 470 | 65 | 830 | 320 | 60 | 376 | 9 | 230 | 326 | 126 | 380 | 110 | *4 | 220 | 50 | — | Example |
| 61 | AC | 910 | 510 | 45 | 820 | 120 | 41 | 365 | 4 | 170 | 315 | 115 | 340 | 70 | *5 | 170 | 150 | GA | Example |
| 62 | AD | 940 | 480 | 50 | 800 | 310 | 32 | 420 | 6 | 200 | 370 | 170 | 400 | 190 | *5 | 130 | 340 | GI | Comparative example |
| 63 | AD | 860 | 500 | 50 | 790 | 450 | 61 | 319 | 14 | 240 | 269 | 69 | 370 | 100 | *4 | 280 | 110 | — | Comparative example |
| 64 | AE | 910 | 510 | 70 | 780 | 330 | 35 | 367 | 12 | 160 | 317 | 117 | 390 | 160 | *5 | 140 | 50 | GI | Comparative example |
| 65 | AF | 920 | 590 | 35 | 750 | 390 | 42 | 387 | 9 | 190 | 337 | 137 | 430 | 230 | *5 | 200 | 380 | EG | Comparative example |
| 66 | AG | 890 | 460 | 55 | 810 | 310 | 45 | 334 | 12 | 280 | 284 | 84 | 380 | 50 | *5 | 190 | 260 | GA | Comparative example |
| 67 | AH | 910 | 530 | 50 | 850 | 220 | 28 | 370 | 7 | 210 | 320 | 120 | 340 | 110 | *4 | 150 | 40 | EG | Comparative example |
| 68 | AI | 880 | 530 | 60 | 800 | 500 | 30 | 376 | 8 | 270 | 326 | 126 | 400 | 340 | *5 | 180 | 270 | GI | Comparative example |
| 69 | AJ | 900 | 550 | 60 | 790 | 550 | 36 | 414 | 13 | 260 | 364 | 164 | 440 | 50 | *5 | 240 | 140 | — | Comparative example |
| 70 | AK | 890 | 510 | 55 | 830 | 240 | 42 | 364 | 9 | 250 | 314 | 114 | 360 | 80 | No holding | — | — | — | Comparative example |
| 71 | J | 890 | 500 | 45 | 900 | 180 | 51 | 382 | 12 | 290 | 332 | 132 | 400 | 420 | *4 | 220 | 70 | GI | Example |
| 72 | J | 920 | 510 | 35 | 830 | 250 | 35 | 365 | 11 | 160 | 315 | 115 | 300 | 350 | *4 | 150 | 130 | GI | Example |
| 73 | J | 870 | 470 | 50 | 790 | 360 | 51 | 350 | 6 | 200 | 300 | 100 | 290 | 70 | *5 | 220 | 330 | GI | Comparative example |
| 74 | J | 900 | 490 | 65 | 820 | 270 | 36 | 361 | 5 | 170 | 311 | 111 | 500 | 120 | *5 | 210 | 90 | EG | Example |
| 75 | J | 930 | 470 | 60 | 890 | 160 | 57 | 382 | 4 | 140 | 332 | 132 | 510 | 290 | *4 | 180 | 18 | GA | Example |
| 76 | J | 880 | 480 | 35 | 820 | 150 | 54 | 362 | 10 | 210 | 312 | 112 | 410 | 20 | *4 | 170 | 50 | GA | Comparative example |
| 77 | J | 920 | 550 | 40 | 780 | 210 | 60 | 349 | 5 | 120 | 299 | 99 | 480 | 15 | *5 | 140 | 240 | — | Comparative example |
| 78 | J | 910 | 550 | 30 | 830 | 120 | 79 | 366 | 8 | 210 | 316 | 116 | 360 | 500 | *5 | 280 | 100 | — | Example |
| 79 | J | 900 | 530 | 70 | 850 | 220 | 51 | 371 | 8 | 260 | 321 | 121 | 400 | 510 | *4 | 240 | 240 | EG | Example |

TABLE 2-continued

| Steel sheet No. | Type of steel | Hot-rolling Finish rolling temperature (°C) | Coiling temperature (°C) | Cold-rolling Rolling reduction (%) | Annealing Temperature (°C) | Holding time | Quenching *1 (°C/s) | Ms (°C) | *2 (°C/s) | *3 (°C) | Ms-50 (°C) | Ms-250 (°C) | Tempering Temperature (°C) | Holding time (s) | Holding pattern | Heat treatment Temperature (°C) | Holding time (s) | Coating | Note |
|---|---|---|---|---|---|---|---|---|---|---|---|---|---|---|---|---|---|---|---|
| 80 | J | 890 | 490 | 60 | 800 | 200 | 47 | 354 | 10 | 260 | 304 | 104 | 430 | 400 | *5 | 300 | 170 | GA | Example |
| 81 | J | 910 | 480 | 45 | 860 | 310 | 56 | 372 | 14 | 290 | 322 | 122 | 400 | 300 | *5 | 310 | 150 | GI | Comparative example |

*1: Average cooling rate from annealing temperature to martensite transformation start temperature Ms
*2: Average cooling rate from martensite start temperature Ms to finish cooling temperature
*3: Finish cooling temperature
*4: Cooling to and holding at holding temperature after tempering step
*5: Cooling to less than 100° C. after tempering step and then heating to holding temperature
EG: Electrogalvanizing, GI: Hot-dip galvanizing, GA: Hot-dip galvannealing The steel sheets were subjected to skin pass rolling at a rolling reduction of 0.2%, and then the area fractions of ferrite (F), bainite (B), tempered martensite (TM), and retained austenite (RA) were determined by the following method. A change in (a grain size in a thickness direction)/(a grain size in a direction perpendicular to the thickness) of tempered martensite in an L cross section in a 0- to 50-μm region from a surface of a steel sheet on a compression side was also measured by the method described above in 90-degree bending at a curvature radius/thickness ratio of 4.2 in the rolling (L) direction with respect to an axis extending in the width (C) direction.

The area fraction of each microstructure is measured in the following way. A thickness cross section of a steel sheet cut at a right angle to the rolling direction is polished and etched in 3% by volume nital and is photographed at a quarter thickness position with a scanning electron microscope (SEM) at a magnification of 1500 times in three visual fields. The area fraction of each microstructure is determined from the captured image data using Image-Pro available from Media Cybernetics. The area fraction of each microstructure is the average area fraction of the three visual fields. In the image data, ferrite can be distinguished as black, bainite as black including island-like retained austenite or gray including carbides with the same orientation, tempered martensite as light gray including fine carbides with different orientations, and retained austenite as white. Although not shown in Table 3, the remaining microstructures were determined by subtracting the total area fraction of ferrite (F), bainite (B), tempered martensite (TM), and retained austenite (RA) from 100%, and the remaining microstructures were considered to be pearlite and/or cementite.

An X-ray diffraction intensity was measured to determine the volume fraction of retained austenite, and the volume fraction was regarded as the area fraction of retained austenite. The volume fraction of retained austenite is the ratio of the integrated X-ray diffraction intensity of (200), (220), and (311) planes in fcc iron to the integrated X-ray diffraction intensity of (200), (211), and (220) planes in bcc iron at a quarter thickness.

The grain size of tempered martensite in the thickness direction and the grain size of the tempered martensite in the direction perpendicular to the thickness were measured in the following way. After polishing a thickness cross section of a steel sheet cut in the rolling direction, an L cross section in a 0- to 50-μm region from a surface of the steel sheet at a bending top on the compression side was photographed with a scanning electron microscope (SEM) at a magnification of 3000 times in three visual fields. The grain size of tempered martensite in the thickness direction (the length in the thickness direction) and the grain size of the tempered martensite in a direction perpendicular to the thickness (the length in the direction perpendicular to the thickness) were determined from the captured image data using Image-Pro available from Media Cybernetics. Each grain size is calculated by averaging the grain sizes in the three visual fields. This measurement was performed before and after 90-degree bending.

Tensile properties and collision characteristics were determined by the following test methods. Table 3 shows the results.

<Tensile Test>

The tensile strength (TS) was determined by taking a JIS No. 5 test piece for tensile test (JIS Z 2201) from a steel sheet in a direction perpendicular to the rolling direction and performing a tensile test at a strain rate of $10^{-3}$/s in accordance with JIS Z 2241 (2011). A TS of 980 MPa or more was judged to be acceptable.

<Bending-Orthogonal Bending Test>

A steel sheet was subjected to 90-degree bending (primary bending) at a curvature radius/thickness ratio of 4.2 in the rolling (L) direction with respect to an axis extending in the width (C) direction to prepare a test specimen. In the 90-degree bending (primary bending), as illustrated in FIG. 2, a punch B1 was pressed against a steel sheet on a die A1 with a V-groove to prepare a test specimen T1. Next, as illustrated in FIG. 3, the test specimen T1 on support rolls A2 was subjected to orthogonal bending (secondary bending) by pressing a punch B2 against the test specimen T1 in the direction perpendicular to the rolling direction. In FIGS. 2 and 3, D1 denotes the width (C) direction, and D2 denotes the rolling (L) direction.

FIG. 4 illustrates the test specimen T1 after the steel sheet was subjected to 90-degree bending (primary bending). FIG. 5 illustrates the test specimen T2 after the test specimen T1 was subjected to the orthogonal bending (secondary bending). The positions indicated by the broken lines on the test specimen T2 in FIG. 5 correspond to the positions indicated by the broken lines on the test specimen T1 in FIG. 4 before the orthogonal bending.

The conditions for the orthogonal bending are as follows:
[Orthogonal Bending Conditions]
Test method: roll support, punch pressing
Roll diameter: ϕ30 mm
Punch tip R: 0.4 mm
Distance between rolls: (sheet thickness×2)+0.5 mm
Stroke speed: 20 mm/min
Test specimen size: 60 mm×60 mm
Bending direction: a direction perpendicular to the rolling direction The stroke at the maximum load was determined in a stroke-load curve of the orthogonal bending. The average stroke ΔS at the maximum load was determined by performing the bending-orthogonal bending test three times. ΔS of 27 mm or more was judged to be high fracture resistance.

<Axial Crushing Test>

An axial crushing test was performed on steel sheets 1.2 mm in thickness in consideration of the effects of the thickness. A steel sheet produced through the production steps described above was cut and formed (bent) to a depth of 40 mm using a die with a punch shoulder radius of 5.0 mm and a die shoulder radius of 5.0 mm to produce a hat-shaped member 10 illustrated in FIGS. 6 and 7. The steel sheet used as the material of the hat-shaped member was separately cut into a size of 200 mm×80 mm. Next, a steel sheet 20 thus cut out and the hat-shaped member 10 were spot welded to produce a test member 30 as illustrated in FIGS. 6 and 7. FIG. 6 is a front view of the test member 30 produced by spot-welding the hat-shaped member 10 and the steel sheet 20. FIG. 7 is a perspective view of the test member 30. As illustrated in FIG. 7, spot welds 40 were positioned such that the distance between an end portion of the steel sheet and a weld was 10 mm and the distance between the welds was 45 mm. Next, as illustrated in FIG. 8, the test member 30 was joined to a base plate 50 by TIG welding to prepare a sample for the axial crushing test. Next, the prepared axial crushing test sample was collided with an impactor 60 at a constant impact speed of 10 m/s to crush the axial crushing test sample by 100 mm. As illustrated in FIG. 8, the crushing direction D3 was parallel to the longitudinal direction of the test member 30. The area in a crushing stroke-load graph at a stroke in the range of 0 to 100 mm was determined, and the average area of the test performed three times was taken as absorbed energy ($F_{ave}$). $F_{ave}$ of 40000 N or more was judged to be high absorbed energy. Collision characteristics were judged to be good when both fracture resistance and absorbed energy were high.

TABLE 3

| Steel sheet No. | Steel microstructure ||||| | Tensile strength | Collision characteristics ||  |
|---|---|---|---|---|---|---|---|---|---|---|
| | V(F) (%) | V(TM + B) (%) | V(B) (%) | V(RA) (%) | V(F + RA + TM + B) (%) | *1 | TS (MPa) | Bending test ΔS (mm) | Axial crushing test $F_{ave}$ (N) | Note |
| 1 | 33 | 60 | 5 | 5 | 98 | 0.51 | 1017 | 29 | 46736 | Example |
| 2 | 39 | 82 | 6 | 7 | 99 | 0.58 | 1051 | 32 | 47652 | Example |
| 3 | 21 | 74 | 4 | 4 | 99 | 0.47 | 1153 | 28 | 52490 | Example |
| 4 | 27 | 69 | 5 | 4 | 100 | 0.57 | 1085 | 32 | 43638 | Example |
| 5 | 39 | 50 | 3 | 4 | 93 | 0.44 | 986 | 27 | 41238 | Example |
| 6 | 21 | 71 | 7 | 8 | 100 | 0.59 | 1153 | 32 | 51594 | Example |
| 7 | 33 | 62 | 5 | 5 | 100 | 0.51 | 1017 | 29 | 48662 | Example |
| 8 | 24 | 67 | 5 | 8 | 99 | 0.65 | 1119 | 35 | 49397 | Example |
| 9 | 9 | 85 | 6 | 6 | 100 | 0.53 | 1290 | 30 | 58403 | Example |
| 10 | 18 | 68 | 20 | 13 | 99 | 0.60 | 1188 | 33 | 51344 | Example |
| 11 | 30 | 68 | 4 | 4 | 100 | 0.51 | 1051 | 29 | 48369 | Example |
| 12 | 36 | 66 | 8 | 4 | 190 | 0.66 | 982 | 35 | 45685 | Example |
| 13 | 15 | 80 | 10 | 5 | 100 | 0.52 | 1222 | 30 | 55549 | Example |
| 14 | 36 | 57 | 3 | 5 | 98 | 0.49 | 982 | 28 | 45400 | Example |
| 15 | 27 | 64 | 10 | 9 | 100 | 0.50 | 1085 | 29 | 48265 | Example |
| 16 | 12 | 58 | 15 | 15 | 95 | 0.62 | 1256 | 33 | 53425 | Example |
| 17 | 30 | 65 | 5 | 4 | 99 | 0.42 | 1051 | 27 | 48322 | Example |
| 18 | 27 | 58 | 16 | 15 | 100 | 0.64 | 1195 | 34 | 48457 | Example |
| 19 | 35 | 58 | 8 | 7 | 100 | 0.59 | 960 | 33 | 46781 | Comparative example |
| 20 | 33 | 63 | 5 | 3 | 99 | 0.55 | 1101 | 31 | 48609 | Example |
| 21 | 32 | 61 | 8 | 6 | 99 | 0.49 | 961 | 28 | 48253 | Comparative example |
| 22 | 24 | 69 | 10 | 5 | 98 | 0.59 | 1280 | 33 | 53701 | Example |
| 23 | 38 | 58 | 10 | 4 | 100 | 0.67 | 969 | 35 | 46711 | Example |
| 24 | 39 | 48 | 18 | 13 | 100 | 0.59 | 1035 | 32 | 43343 | Example |
| 25 | 51 | 43 | 7 | 6 | 100 | 0.46 | 873 | 27 | 40453 | Comparative example |
| 26 | 27 | 61 | 12 | 11 | 99 | 0.56 | 1017 | 31 | 46742 | Example |
| 27 | 42 | 54 | 3 | 4 | 100 | 0.49 | 890 | 28 | 43021 | Comparative example |
| 28 | 30 | 62 | 13 | 8 | 100 | 0.65 | 1245 | 35 | 50410 | Example |
| 29 | 45 | 49 | 10 | 5 | 99 | 0.36 | 1023 | 28 | 38683 | Comparative example |
| 30 | 15 | 78 | 5 | 6 | 99 | 0.59 | 1422 | 32 | 58974 | Example |
| 31 | 6 | 81 | 7 | 4 | 91 | 0.33 | 1389 | 25 | 59121 | Comparative example |
| 32 | 24 | 70 | 7 | 6 | 100 | 0.54 | 1290 | 30 | 53684 | Example |
| 33 | 12 | 81 | 9 | 7 | 100 | 0.31 | 1447 | 24 | 60254 | Comparative example |
| 34 | 33 | 63 | 5 | 4 | 100 | 0.53 | 1094 | 30 | 48288 | Example |
| 35 | 38 | 38 | 10 | 14 | 90 | 0.30 | 910 | 24 | 37387 | Comparative example |
| 36 | 21 | 73 | 6 | 6 | 100 | 0.60 | 1262 | 33 | 53912 | Example |
| 37 | 18 | 80 | 6 | 2 | 100 | 0.42 | 1299 | 26 | 56978 | Comparative example |
| 38 | 9 | 84 | 5 | 5 | 98 | 0.57 | 1436 | 32 | 61823 | Example |
| 39 | 30 | 65 | 2 | 3 | 98 | 0.29 | 1144 | 22 | 50220 | Comparative example |
| 40 | 36 | 60 | 7 | 4 | 100 | 0.56 | 1067 | 31 | 47084 | Example |
| 41 | 47 | 49 | 2 | 3 | 99 | 0.59 | 883 | 32 | 41939 | Comparative example |
| 42 | 33 | 58 | 8 | 9 | 100 | 0.50 | 1080 | 29 | 46587 | Example |
| 43 | 12 | 80 | 2 | 8 | 100 | 0.34 | 1346 | 25 | 58014 | Comparative example |
| 44 | 30 | 62 | 14 | 8 | 100 | 0.56 | 1161 | 31 | 48958 | Example |
| 45 | 36 | 52 | 4 | 4 | 92 | 0.38 | 1063 | 26 | 38761 | Comparative example |
| 46 | 33 | 61 | 5 | 6 | 100 | 0.64 | 1101 | 34 | 47856 | Example |
| 47 | 36 | 51 | 5 | 5 | 92 | 0.36 | 1067 | 24 | 38796 | Comparative example |
| 48 | 21 | 72 | 9 | 7 | 100 | 0.63 | 1183 | 34 | 52412 | Example |
| 49 | 15 | 79 | 6 | 5 | 99 | 0.33 | 1249 | 25 | 56017 | Comparative example |
| 50 | 24 | 70 | 14 | 6 | 100 | 0.49 | 1280 | 29 | 53516 | Example |
| 51 | 18 | 69 | 15 | 13 | 100 | 0.61 | 1301 | 33 | 53437 | Example |
| 52 | 12 | 78 | 7 | 10 | 100 | 0.65 | 1383 | 35 | 57805 | Example |
| 53 | 27 | 66 | 12 | 7 | 100 | 0.48 | 1148 | 28 | 49822 | Example |
| 54 | 33 | 59 | 6 | 7 | 99 | 0.57 | 1158 | 32 | 48343 | Example |
| 55 | 39 | 55 | 3 | 5 | 99 | 0.64 | 985 | 34 | 44599 | Example |
| 56 | 36 | 56 | 16 | 7 | 99 | 0.60 | 1040 | 33 | 45712 | Example |
| 57 | 27 | 66 | 15 | 7 | 100 | 0.52 | 1233 | 30 | 51250 | Example |
| 58 | 33 | 62 | 7 | 5 | 100 | 0.66 | 1235 | 35 | 50117 | Example |
| 59 | 18 | 75 | 19 | 7 | 100 | 0.57 | 1556 | 32 | 60180 | Example |
| 60 | 24 | 68 | 8 | 8 | 100 | 0.50 | 1236 | 29 | 52134 | Example |
| 61 | 27 | 68 | 4 | 5 | 100 | 0.59 | 1210 | 32 | 51561 | Example |
| 62 | 33 | 59 | 6 | 8 | 100 | 0.61 | 925 | 33 | 44632 | Comparative example |
| 63 | 36 | 58 | 11 | 6 | 100 | 0.34 | 1172 | 23 | 47958 | Comparative example |
| 64 | 39 | 57 | 6 | 4 | 100 | 0.38 | 969 | 27 | 45275 | Comparative example |
| 65 | 51 | 38 | 7 | 2 | 91 | 0.66 | 920 | 35 | 46871 | Comparative example |
| 66 | 30 | 53 | 12 | 17 | 100 | 0.42 | 1591 | 26 | 49564 | Comparative example |
| 67 | 18 | 76 | 7 | 6 | 100 | 0.38 | 1293 | 25 | 55635 | Comparative example |
| 68 | 33 | 57 | 14 | 9 | 99 | 0.36 | 1073 | 24 | 46427 | Comparative example |
| 69 | 43 | 51 | 6 | 6 | 100 | 0.56 | 966 | 31 | 47133 | Comparative example |
| 70 | 26 | 65 | 8 | 9 | 100 | 0.32 | 1181 | 23 | 50120 | Comparative example |

TABLE 3-continued

| Steel sheet No. | Steel microstructure | | | | | Tensile strength | Collision characteristics | | Note |
| | V(F) (%) | V(TM + B) (%) | V(B) (%) | V(RA) (%) | V(F + RA + TM + B) (%) | *1 | TS (MPa) | Bending test ΔS (mm) | Axial crushing test $F_{ave}$ (N) | |
|---|---|---|---|---|---|---|---|---|---|---|
| 71 | 9 | 77 | 20 | 13 | 99 | 0.56 | 1208 | 29 | 53461 | Example |
| 72 | 25 | 70 | 5 | 4 | 99 | 0.51 | 1159 | 27 | 54993 | Example |
| 73 | 35 | 58 | 2 | 7 | 100 | 0.38 | 1166 | 26 | 52160 | Comparative example |
| 74 | 28 | 68 | 4 | 4 | 100 | 0.57 | 1087 | 29 | 50929 | Example |
| 75 | 9 | 84 | 2 | 4 | 97 | 0.55 | 972 | 28 | 49753 | Comparative example |
| 76 | 27 | 66 | 5 | 7 | 100 | 0.51 | 1242 | 28 | 57117 | Example |
| 77 | 36 | 58 | 3 | 5 | 99 | 0.38 | 1134 | 26 | 47314 | Comparative example |
| 78 | 24 | 68 | 12 | 8 | 100 | 0.61 | 1062 | 30 | 51395 | Example |
| 79 | 20 | 70 | 20 | 8 | 98 | 0.64 | 1085 | 30 | 50316 | Example |
| 80 | 33 | 54 | 17 | 10 | 97 | 0.51 | 1077 | 27 | 52462 | Example |
| 81 | 19 | 62 | 21 | 11 | 92 | 0.41 | 1103 | 25 | 39005 | Comparative example |

V(F): Area fraction of ferrite, V(TM): Area fraction of tempered martensite, V(B): Area fraction of bainite, V(RA): Area fraction of retained austenite
V(F + RA + TM + B): Total area fraction of ferrite, tempered martensite, bainite, and retained austenite
ΔS: Fracture resistance, $F_{ave}$: Absorbed energy
*1: Amount of change in (a grain size in a thickness direction)/(a grain size in a direction perpendicular to the thickness) of tempered martensite in an L cross section in a 0-to 50-μm region from a surface of a steel sheet on a compression side in 90-degree bending at curvature radius/thickness: 4.2 in the rolling (L) direction with respect to an axis extending in the width (C) direction The steel sheets according to the examples had a TS of 980 MPa or more and good collision characteristics. By contrast, the steel sheets according to the comparative examples had a TS of less than 980 MPa or poor collision characteristics.

Example 2

A steel sheet of No. 3 (Example) in Table 3 of Example 1 was subjected to press forming to produce a member according to an Example. The steel sheet of No. 3 in Table 3 of Example 1 and a steel sheet of No. 9 (Example) in Table 3 of Example 1 were joined together by spot welding to produce a member according to an Example. It was confirmed that a member according to an Example produced by using a steel sheet according to the disclosed embodiments had good collision characteristics and high strength, and that all of the member produced by forming the steel sheet of No. 3 (Example) in Table 3 of Example 1 and the member produced by spot welding the steel sheet of No. 3 in Table 3 of Example 1 and the steel sheet of No. 9 (Example) in Table 3 of Example 1 could be suitably used for automobile frame parts and the like.

Example 31

A galvanized steel sheet of No. 1 (Example) in Table 3 of Example 1 was subjected to press forming to produce a member according to an Example. The galvanized steel sheet of No. 1 in Table 3 of Example 1 and a galvanized steel sheet of No. 4 (Example) in Table 3 of Example 1 were joined together by spot welding to produce a member according to an Example. It was confirmed that a member according to an Example produced by using a steel sheet according to the disclosed embodiments had good collision characteristics and high strength, and that all of the member produced by forming the steel sheet of No. 1 (Example) in Table 3 of Example 1 and the member produced by spot welding the steel sheet of No. 1 in Table 3 of Example 1 and the steel sheet of No. 4 (Example) in Table 3 of Example 1 could be suitably used for automobile frame parts and the like.

REFERENCE SIGNS LIST 10 hat-shaped member
20 steel sheet
30 test member
40 spot weld
50 base plate
60 impactor
A1 die
A2 support rolls
B1 punch
B2 punch
D1 width (C) direction
D2 rolling (L) direction
D3 crushing direction
T1 test specimen
T2 test specimen
X0 corner
XA measurement position (measurement region) of grain size of tempered martensite after bending

INDUSTRIAL APPLICABILITY

The disclosed embodiments can provide a steel sheet with a TS of 980 MPa or more and with good collision characteristics. The use of a member produced by using a steel sheet according to the disclosed embodiments as an automotive part can contribute to the reduction of vehicle weight and greatly contribute to improved performance of automobile bodies.

The invention claimed is:
1. A steel sheet comprising:
a chemical composition satisfying an equivalent carbon content Ceq of 0.60% or more and less than 0.85%; and
a steel microstructure with an area fraction of ferrite: less than 40%, tempered martensite and bainite: 40% or more in total, retained austenite: 3% to 15%, and ferrite, tempered martensite, bainite, and retained austenite: 93% or more in total,
wherein 90-degree bending at a curvature radius/thickness ratio of 4.2 in a rolling (L) direction with respect to an axis extending in a width (C) direction causes a change of 0.40 or more in (a grain size in a thickness direction)/(a grain size in a direction perpendicular to the thickness) of the tempered martensite in an L cross section in a 0- to 50-μm region from a surface of the steel sheet on a compression side, and the steel sheet has a tensile strength of 980 MPa or more.

2. The steel sheet according to claim 1, wherein
the chemical composition contains, on a mass percent basis,
C: 0.07% to 0.20%,
Si: 0.1% to 2.0%,
Mn: 2.0% to 3.5%,
P: 0.05% or less,
S: 0.05% or less,
Sol. Al: 0.005% to 0.1%, and
N: 0.010% or less, a remainder being composed of Fe and incidental impurities.

3. The steel sheet according to claim 2, wherein
the chemical composition further contains, on a mass percent basis,
at least one selected from the group consisting of:
Cr: 1.0% or less,
Mo: 0.5% or less,
V: 0.5% or less,
Ti: 0.5% or less,
Nb: 0.5% or less,
B: 0.005% or less,
Ni: 1.0% or less,
Cu: 1.0% or less,
Sb: 1.0% or less,
Sn: 1.0% or less,
Ca: 0.005% or less, and
REM: 0.005% or less.

4. The steel sheet according to claim 1, further comprising: an electrogalvanized layer, a hot-dip galvanized layer, or a hot-dip galvannealed layer on a surface thereof.

5. A member produced by performing at least one of forming and welding on the steel sheet according to claim 1.

6. The steel sheet according to claim 2, further comprising: an electrogalvanized layer, a hot-dip galvanized layer, or a hot-dip galvannealed layer on a surface thereof.

7. The steel sheet according to claim 3, further comprising: an electrogalvanized layer, a hot-dip galvanized layer, or a hot-dip galvannealed layer on a surface thereof.

8. A member produced by performing at least one of forming and welding on the steel sheet according to claim 2.

9. A member produced by performing at least one of forming and welding on the steel sheet according to claim 3.

10. A member produced by performing at least one of forming and welding on the steel sheet according to claim 4.

11. A member produced by performing at least one of forming and welding on the steel sheet according to claim 6.

12. A member produced by performing at least one of forming and welding on the steel sheet according to claim 7.

13. A method for producing the steel sheet according to claim 2, comprising:
a hot-rolling step of hot-rolling a steel slab satisfying the equivalent carbon content Ceq of 0.60% or more and less than 0.85% and having the chemical composition at a finish rolling temperature in the range of 850° C. to 950° C. and coiling the resulting hot-rolled steel sheet at a coiling temperature of 600° C. or less;
a cold-rolling step of cold-rolling the hot-rolled steel sheet after the hot-rolling step at a rolling reduction of more than 20%;
an annealing step of heating the cold-rolled steel sheet after the cold-rolling step to an annealing temperature of 750° C. or more and holding the steel sheet for 30 seconds or more;
a quenching step of cooling the steel sheet at an average cooling rate of 20° C./s or more in a temperature range of the annealing temperature to a martensite transformation start temperature Ms and then cooling the steel sheet from the martensite transformation start temperature Ms to a finish cooling temperature in the range of (Ms −250° C.) to (Ms −50° C.) at an average cooling rate in the range of 2° C./s to 15° C./s;
a tempering step of holding the steel sheet in the temperature range of 300° C. to 500° C. for 20 seconds or more; and
a heat-treatment step of holding the steel sheet in the temperature range of 100° C. to 300° C. for 20 seconds or more after the tempering step.

14. The method according to claim 13, further comprising a coating step of applying electrogalvanizing, hot-dip galvanizing, or hot-dip galvannealing to a surface of the steel sheet after the tempering step and before the heat-treatment step.

15. A method for producing a member, comprising the step of performing at least one of forming and welding on the steel sheet produced by the method according to claim 13.

16. A method for producing the steel sheet according to claim 3, comprising:
a hot-rolling step of hot-rolling a steel slab satisfying the equivalent carbon content Ceq of 0.60% or more and less than 0.85% and having the chemical composition at a finish rolling temperature in the range of 850° C. to 950° C. and coiling the resulting hot-rolled steel sheet at a coiling temperature of 600° C. or less;
a cold-rolling step of cold-rolling the hot-rolled steel sheet after the hot-rolling step at a rolling reduction of more than 20%;
an annealing step of heating the cold-rolled steel sheet after the cold-rolling step to an annealing temperature of 750° C. or more and holding the steel sheet for 30 seconds or more;
a quenching step of cooling the steel sheet at an average cooling rate of 20° C./s or more in a temperature range of the annealing temperature to a martensite transformation start temperature Ms and then cooling the steel sheet from the martensite transformation start temperature Ms to a finish cooling temperature in the range of (Ms −250° C.) to (Ms −50° C.) at an average cooling rate in the range of 2° C./s to 15° C./s;
a tempering step of holding the steel sheet in the temperature range of 300° C. to 500° C. for 20 seconds or more; and
a heat-treatment step of holding the steel sheet in the temperature range of 100° C. to 300° C. for 20 seconds or more after the tempering step.

17. The method according to claim 16, further comprising a coating step of applying electrogalvanizing, hot-dip galvanizing, or hot-dip galvannealing to a surface of the steel sheet after the tempering step and before the heat-treatment step.

18. A method for producing a member, comprising the step of performing at least one of forming and welding on the steel sheet produced by the method according to claim 16.

19. A method for producing a member, comprising the step of performing at least one of forming and welding on the steel sheet produced by the method according to claim 14.

20. A method for producing a member, comprising the step of performing at least one of forming and welding on the steel sheet produced by the method according to claim 17.

* * * * *